US008699803B2

(12) United States Patent
Katayama et al.

(10) Patent No.: US 8,699,803 B2
(45) Date of Patent: Apr. 15, 2014

(54) DISPLAY DRIVING CIRCUIT

(75) Inventors: Yukari Katayama, Chigasaki (JP); Akihito Akai, Kawasaki (JP); Yoshiki Kurokawa, Tokyo (JP); Yusuke Uchida, Tokyo (JP)

(73) Assignee: Renesas SP Drivers Inc., Tokyo (JP)

( * ) Notice: Subject to any disclaimer, the term of this patent is extended or adjusted under 35 U.S.C. 154(b) by 514 days.

(21) Appl. No.: 13/033,659

(22) Filed: Feb. 24, 2011

(65) Prior Publication Data

US 2011/0206290 A1 Aug. 25, 2011

(30) Foreign Application Priority Data

Feb. 24, 2010 (JP) ................................. 2010-038907

(51) Int. Cl.
*G06K 9/36* (2006.01)

(52) U.S. Cl.
USPC ............................ 382/233; 382/250; 345/690

(58) Field of Classification Search
None
See application file for complete search history.

(56) References Cited

U.S. PATENT DOCUMENTS

| | | | | |
|---|---|---|---|---|
| 8,294,695 B2* | 10/2012 | Chen et al. | ..................... | 345/204 |
| 2004/0145596 A1* | 7/2004 | Yamakawa et al. | ........... | 345/690 |
| 2005/0206603 A1 | 9/2005 | Kawachi et al. | | |
| 2005/0225522 A1* | 10/2005 | Wu et al. | ......................... | 345/87 |
| 2005/0225525 A1* | 10/2005 | Wu et al. | ......................... | 345/89 |
| 2006/0208960 A1* | 9/2006 | Glen | .............................. | 345/3.1 |
| 2007/0019878 A1 | 1/2007 | Oura | | |
| 2007/0024558 A1* | 2/2007 | Oura | .............................. | 345/89 |
| 2008/0001939 A1* | 1/2008 | Wang et al. | ................... | 345/204 |
| 2008/0180420 A1* | 7/2008 | Chen | .............................. | 345/204 |
| 2008/0204393 A1* | 8/2008 | Ben-David | ...................... | 345/98 |
| 2008/0294816 A1* | 11/2008 | Fuji | ................................. | 710/68 |
| 2009/0021499 A1* | 1/2009 | Chen et al. | ..................... | 345/204 |
| 2009/0079714 A1* | 3/2009 | Shih et al. | ....................... | 345/204 |
| 2009/0087114 A1* | 4/2009 | Porter | ............................ | 382/252 |

(Continued)

FOREIGN PATENT DOCUMENTS

| | | | |
|---|---|---|---|
| JP | 2004240410 A | * | 8/2004 |
| JP | 2005-301219 A | | 10/2005 |

(Continued)

OTHER PUBLICATIONS

Thomas Wiegand et al., "Draft ITU-T Recommendation and Final Draft International Standard of Joint Video Specification (ITU-T Rec. H.264/ ISO/IEC 14496-10 AVC)", Joint Video Team (JVT) of ISO/IEC MPEG & ITU-T VCEG(ISO/IEC JTC1/SC29/WG11 and ITU-T SG16 Q.6) 8th Meeting: Geneva, Switzerland, May 23-27, 2003 http://www.h.264soft.com/download/h.264.pdf [retrieval on Jun. 3, 2006].

*Primary Examiner* — Sean Motsinger
(74) *Attorney, Agent, or Firm* — Miles & Stockbridge P.C.

(57) ABSTRACT

The display driving circuit includes: an OD (OverDrive) calculation circuit operable to generate an OD driving signal for improving the response characteristic of a display device according to display image data; a drive-output circuit operable to supply an OD driving signal to the display device; and a compression circuit operable to store compressed display data in a memory. The compression circuit includes a DCT calculation module operable to execute DCT (Discrete Cosine Transform) of display image data, and an entropy coding module operable to execute variable length entropy coding of DCT conversion display data. Preferably, the display driving circuit further includes a decompression circuit operable to supply an OD calculation circuit with display data resulting from decompression of compressed display data read out the memory.

10 Claims, 11 Drawing Sheets

(56) References Cited

U.S. PATENT DOCUMENTS

| | | | |
|---|---|---|---|
| 2009/0109211 A1* | 4/2009 | Nose et al. | 345/214 |
| 2009/0225096 A1* | 9/2009 | Yoshiga et al. | 345/545 |
| 2009/0315920 A1* | 12/2009 | Sakurai et al. | 345/690 |
| 2010/0045685 A1* | 2/2010 | Suzuki et al. | 345/530 |
| 2010/0220938 A1 | 9/2010 | Higuchi | |
| 2010/0295872 A1* | 11/2010 | Uchida et al. | 345/660 |
| 2010/0302287 A1* | 12/2010 | Katayama et al. | 345/690 |
| 2011/0206290 A1* | 8/2011 | Katayama et al. | 382/250 |

FOREIGN PATENT DOCUMENTS

| | | |
|---|---|---|
| JP | 2006-285382 A | 10/2006 |
| JP | 2007-025528 A | 2/2007 |
| JP | 2007-299004 A | 11/2007 |
| JP | 2009-042289 A | 2/2009 |
| JP | 2009-109835 A | 5/2009 |

* cited by examiner

HORIZONTAL DIRECTION OF IMAGE

HORIZONTAL DIRECTION OF IMAGE

Fig.8
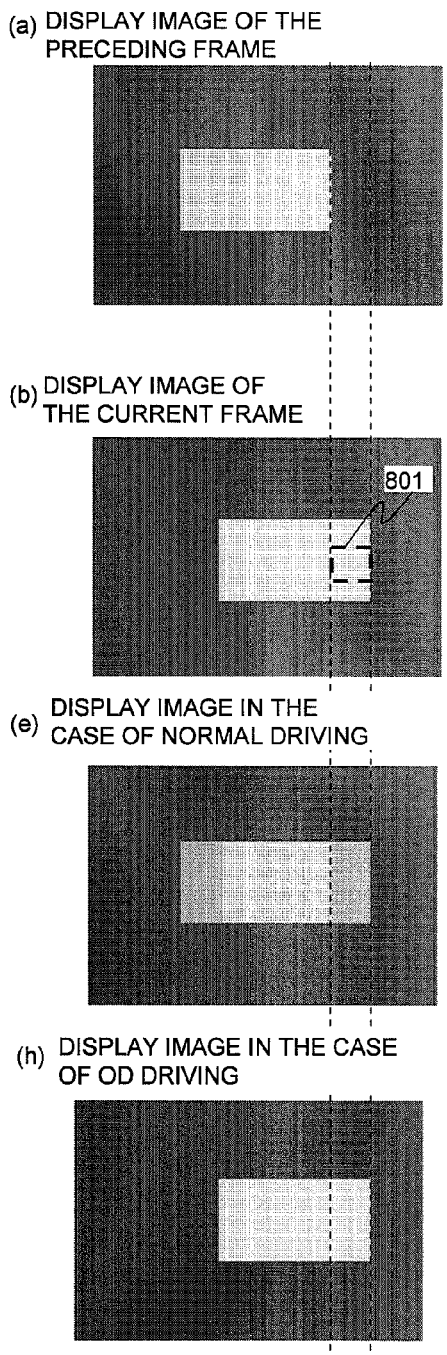
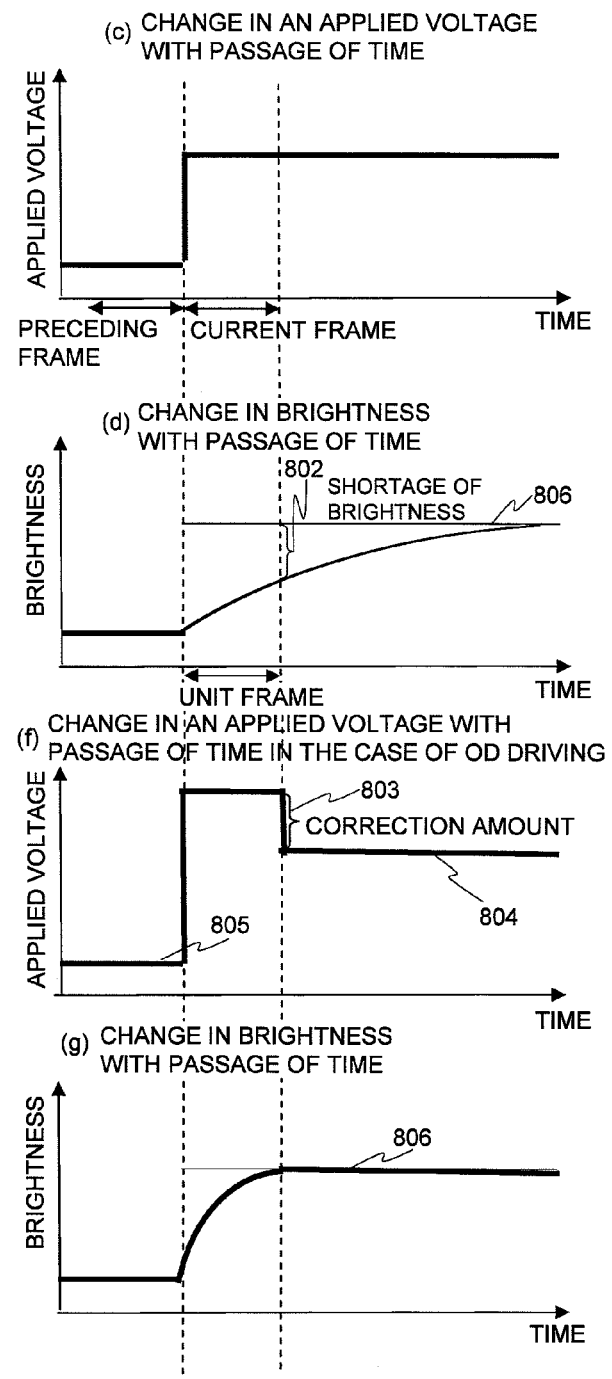

Fig.9

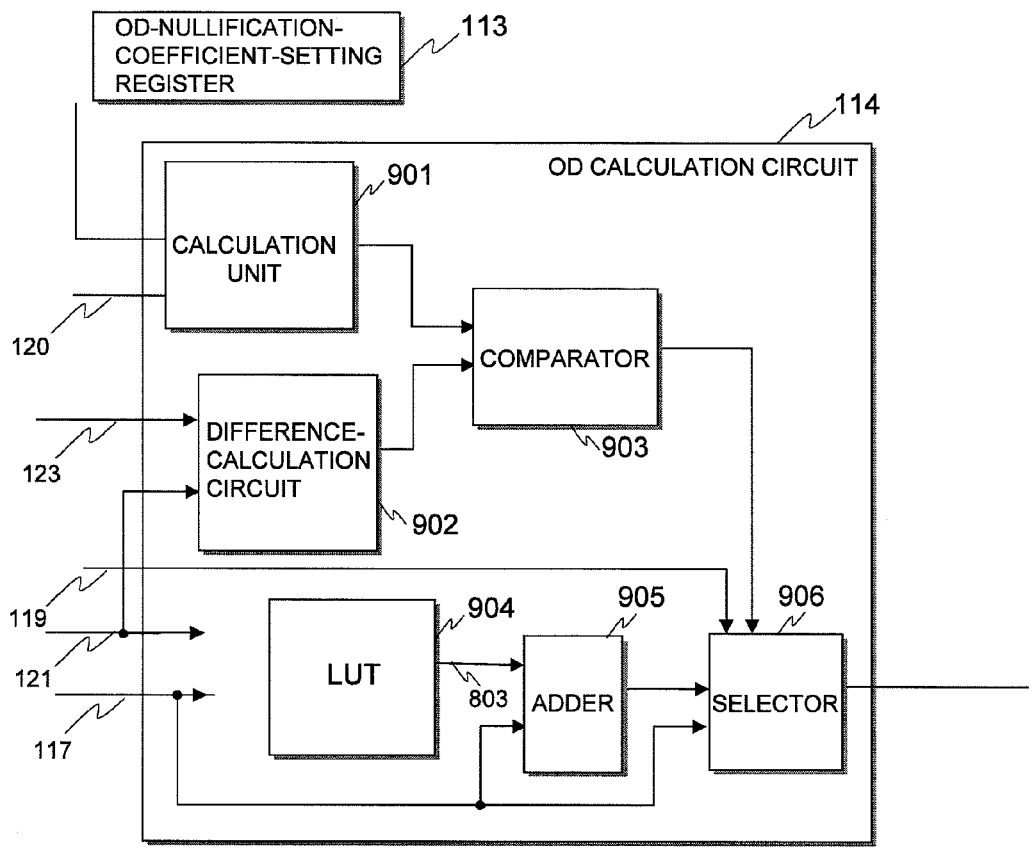

Fig.10

| Relation between the number of bits of entropy coded compressed data of the subsequent frame and its target bit number | Quantization coefficient 207 of the subsequent frame |
|---|---|
| Bit number after compression > Target bit number + β | Current quantization coefficient 207 × 2 |
| Target bit number + β ≥ Bit number after compression > Target bit number - α | Current quantization coefficient 207 + 1 |
| Target bit number - α ≥ Bit number after compression > Target bit number - γ | Current quantization coefficient 207 |
| Target bit number - γ ≥ Bit number after compression > Target bit number - φ | Current quantization coefficient 207 - 1 |
| Bit number after compression ≤ Target bit number - φ | Current quantization coefficient 207 ÷ 2 |

Fig.15
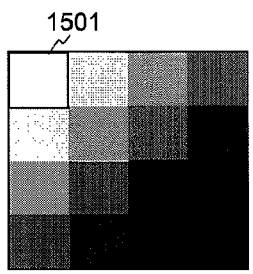
(a)
| 255 | 255 | 180 | 135 |
|---|---|---|---|
| 225 | 180 | 135 | 90 |
| 180 | 135 | 90 | 45 |
| 135 | 90 | 45 | 0 |
(b)
| 192 | 192 | 128 | 128 |
|---|---|---|---|
| 192 | 128 | 128 | 64 |
| 128 | 128 | 64 | 45 |
| 128 | 64 | 0 | 0 |
(c)
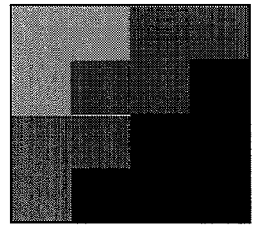
(d)
| 3 | 3 | 2 | 2 |
|---|---|---|---|
| 3 | 2 | 2 | 1 |
| 2 | 2 | 1 | 0 |
| 2 | 1 | 0 | 0 |
(e)
| 8 | 3 | 0 | 0 |
|---|---|---|---|
| 3 | 0 | 0 | 0 |
| 0 | 0 | 0 | 0 |
| 0 | 0 | 0 | 0 |
(f)
| 249 | 219 | 158 | 128 |
|---|---|---|---|
| 219 | 188 | 128 | 97 |
| 158 | 128 | 97 | 36 |
| 128 | 97 | 36 | 0 |
(g)
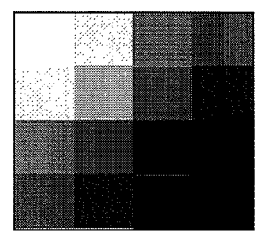
(h)

US 8,699,803 B2

DISPLAY DRIVING CIRCUIT

CROSS-REFERENCE TO RELATED APPLICATIONS

The Present application claims priority from Japanese application JP 2010-038907 filed on Feb. 24, 2010, the content of which is hereby incorporated by reference into this application.

BACKGROUND

The present invention relates to a display driving circuit, and particularly it relates to a technique useful for cutting the storage capacity of a memory for storing a display grayscale level of the preceding frame for driving a display driving circuit according to the overdrive technique, which improves the response characteristic of a display device, thereby to reduce the deterioration of image quality.

In recent years, it is been becoming common to display a television picture through one-segment broadcasting, hereinafter referred to as "ONE-SEG broadcasting" for short, with mobile devices including cellular telephones. In addition, electronic game software programs and the like, which are provided for cellular telephones, are growing. Therefore, the need for displaying a moving image clearly is increasing with cellular telephones.

In general, there has been known the OD technique—OD is an abbreviation for "OverDrive"—as a method for improving the response characteristic of a liquid crystal display. However, OD needs a frame memory in principle, and therefore it has been a problem that the memory increases the chip cost.

FIGS. 8A-8H are a series of diagrams for explaining the basic principle of OD driving, namely driving according to the OD technique.

For example, FIG. 8A shows a display image of the preceding frame, and FIG. 8B presents a display image of the current frame. The voltage applied to a portion of liquid crystal in a position 801 on the display screen is low before the current frame, and high in and after the current frame, as shown in FIG. 8C. However, the response speed of liquid crystal is slow and therefore, even if the applied voltage is switched at a high speed, a target brightness cannot be reached in one-frame period (1/60 seconds), and a shortage 802 of brightness is caused as shown in FIG. 8D because of a slow response speed of the brightness of a liquid crystal panel.

Hence, when the image of FIG. 8A is scanned in the horizontal direction, both ends of the image look blurred as shown in FIG. 8E. To improve the image blurring like this, a high grayscale level voltage prepared by adding a correction amount 803 to a grayscale level voltage 804 of the current frame as shown in FIG. 8F is applied to a frame with the display grayscale level changed. As a result, it becomes possible to converge the display brightness of the liquid crystal panel to a target brightness 806 in the period of one frame, as shown in FIG. 8G, and therefore a display image with less blurring can be displayed as shown in FIG. 8H. Now, it is noted that the correction amount 803 is an output of a function involving, as parameters, a grayscale level voltage 805 of the preceding frame, and a grayscale level voltage 804 of the current frame. As the grayscale level voltage and the display grayscale level are in one-to-one correspondence with each other, the correction amount 803 can be made an output of a function involving, as parameters, a display grayscale level of the preceding frame and a display grayscale level of the current frame. Hence, for execution of OD driving, the display grayscale level of the preceding frame must be stored, and therefore a frame memory is required.

On the other hand, to realize the OD driving at a low cost, a method by which the chip cost is cut by compressing data to store in a memory and then store the compressed data is adopted. An example of the method is disclosed by JP-A-2009-109835. However, such method has the problem that if OD processing is executed using an image prepared by quantizing (compressing) an image of a frame precedent to the currant frame and then decompressing the image, and a current image, which has not been compressed, a still image is judged to be a moving image owing to an error resulting from the compression, and the OD processing is performed on the still image, resulting in the deterioration of image quality of the still image. To solve the problem, JP-A-2009-109835 proposes a method to prevent the image quality of a still image from being deteriorated, by which compression and decompression are performed on not only an image of the preceding frame, but also an image of the current frame, and if a decompressed image of the preceding frame coincides with an decompressed image of the currant frame, OD processing is not executed.

Further, JP-A-2007-025528 discloses a technique for preventing the deterioration of the image quality of a still image by avoiding the execution of OD processing on a still image even in the case of adopting a pseudo grayscale level expressing method referred to as "FRC (Frame Rate Control)" for the still image. According to the technique, quantization-threshold-vicinity-judging data showing whether or not image data is a value in the vicinity of the threshold of quantization, and quantization data are prepared for a current frame and the preceding frame thereof, and a judgment on which of still and moving images the current frame belongs to is made properly. If the current frame is judged to belong to a still image, OD processing is not performed.

Further, instead of a display driving circuit, a moving-image-coding method, MPEG-4AVC (H.264)—one of international standard moving-image-coding methods using DCT (Discrete Cosine Transform)—is described by Thomas Wiegand et al., "DRAFT ITU-T Recommendation and Final Draft International Standard of Joint Video Specification (ITU-T Rec.H.264|ISO/IEC 14496-10 AVC)", Joint Video Team (JVT) of ISO/IEC MPEG & ITU-T VCEG (ISO/IEC JTC1/SC29/WG11 and ITU-T SG16 Q.6), 8th Meeting: Geneva, Switzerland, 23-27 May, 2003, at http://www.h.264soft.com/download/h.264.pdf, provided that URL is a result of search as of Jun. 3, 2006. Incidentally, AVC is an abbreviation for "Advanced Video Coding". The typical compression method for moving images referred to as "MPEG-2" is compliant with a standard standardized according to ISO/IEC 13818-2. MPEG-2 is based on the general rule that the video storage capacity and required band width are made smaller by removing redundant information from a video stream. Incidentally, MPEG is an abbreviation for "Moving Picture Experts Group".

In an encode process of MPEG-2, a video signal is sampled and quantized in order to define color and brightness components of each pixel of a digital video first. Subsequently, values indicating color and brightness components are converted to frequency values using DCT (Discrete Cosine Transform). The transform coefficients resulting from DCT vary between the picture brightness and color in frequency. Thereafter, the quantized DCT conversion coefficients are coded by VLC (Variable Length Coding), by which a video stream is further compressed.

On the other hand, in coding according to MPEG-4AVC (H.264), a syntax element is coded by a highly efficient entropy coding (variable length coding). A syntax element is a piece of information which is conveyed by a syntax, such as a DCT coefficient or a motion vector. Further, in the case of MPEG-4AVC (H.264), a syntax, such as a DCT coefficient or a motion vector, is coded with an Exponential Golomb code—a universal code adopted for a highly efficient entropy coding (variable length coding).

SUMMARY

After the study prior to the invention, the inventors clarified the problem that with the method as disclosed by JP-A-2009-109835, the capacity of a memory for storing a display grayscale level of the preceding frame for OD driving is reduced to achieve the cutting of the cost, and therefore an increase of the compression ratio causes a drastic deterioration of image quality.

FIGS. 15A-15H are a series of diagrams showing how the change in compression ratio varies a decode image in the case of the picture-coding-and-decoding method.

For instance, the case of compressing an original image having a gradation image as shown in FIG. 15A is considered, in which the original image of FIG. 15A includes a plurality of pixels 1501. It is assumed, as an example, that the original image of FIG. 15A has a structure of 4 pixels×4 pixels. FIG. 15B shows the grayscale level value of each pixel. As described in the documents including JP-A-2009-109835, with a quantization method which includes removing lower-order bits when extracting upper-order bits in compression, the number of bits of each pixel after compression is two in the case of compressing 8-bit data to one-quarter. For instance, FIG. 15E represents 2-bit data of higher order, namely results of dividing pixel values shown in FIG. 15B by 64. Specifically, in the example of FIG. 15E, decimal places behind three lower-order bits are truncated. FIG. 15C shows 8-bit data decompressed and restored by multiplying 2-bit data of higher order shown in FIG. 15E by 64. The decompressed and restored 8-bit data shown in FIG. 15C are significantly different from grayscale level values of the original image shown in FIG. 15B. FIG. 15D shows a decode image formed by directly using the decompressed and restored 8-bit data shown in FIG. 15C. The decode image of FIG. 15D makes a display image largely different from the original image of FIG. 15A. The sum of squared errors between the decompressed and restored 8-bit data of FIG. 15C and grayscale level values of pixels of the original image of FIG. 15B is 20533 in this case, which is a very large value. The deterioration of image quality owing to quantization is referred to as "quantization noise" in general.

After the study prior to the invention, the inventors found a problem that in the case of using a large quantization coefficient to quantize image data for the purpose of achieving a large compression ratio, and using an image after compression and decompression with the deterioration—referred to as "quantization noise"—developing thereon as a reference image for calculating a correction amount of OD processing as described above, the deterioration of image quality, i.e. a quantization noise, takes place in an image after OD processing.

Quantization noise arising in an image after OD processing in the case of a reference image with quantization noise developing therein will be described below in detail.

FIG. 3 shows a gradation image. The example of displaying a gradation image 301 as shown in FIG. 3 while scanning in a right direction is taken here.

FIG. 4 is a diagram showing the change in brightness in the case of displaying the gradation image 301 shown by FIG. 3 while scanning in the right direction. Particularly, the change of brightness of the partial image 302 of the gradation image 301 of FIG. 3 is shown in the drawing. In FIG. 4, the reference numeral 401 shows the brightness of the image of the preceding frame, and 402 shows the brightness of the image of the current frame. The reference numeral 403 represents the brightness of an image resulting from execution of quantization using a large quantization coefficient, compression and decompression on the preceding frame image with the brightness 401. Further, the numeral 404 represents the brightness of an image resulting from execution of a quantization using a large quantization coefficient, a compression and a decompression on the current frame image with the brightness 402. According to the method disclosed by JP-A-2009-109835, on condition that an image after compression and decompression of the display image of the current frame coincides, in the value of brightness, with an image after compression and decompression of the display image of the preceding frame, a current image before compression and decompression is output without any change instead of an image subjected to OD processing for the purpose of preventing the deterioration of a still image in execution of OD processing. At the time of using the method as disclosed by JP-A-2009-109835 to form an OD image, OD processing is executed only in a range where the brightness 403 of a preceding frame image subjected to compression and decompression is largely different from the brightness 404 of a current frame image subjected to compression and decompression. As a result, the brightness of an image after OD processing ends up involving noise 405 as shown in the lower half of FIG. 4. Thus, a discontinuity of brightness arises in the gradation image, which is observed as a quantization noise.

In contrast, according to the technique as described in JP-A-2007-025528, quantization-threshold-vicinity-judging data is prepared, and the quantization-threshold-vicinity-judging data is used to judge whether or not to execute OD processing. The technique as described in JP-A-2007-025528 has the problem that one bit of quantization-threshold-vicinity-judging data produced for data of each pixel must be stored, which leads to the increase of the amount of data after compression, and thus a high compression ratio cannot be achieved.

FIG. 5 shows the change of brightness in the case of displaying the gradation image 301 shown in FIG. 3 while scanning the image in the right direction. Particularly the change in the brightness of a partial image 302 of the gradation image 301 of FIG. 3 is shown in the drawing. In FIG. 5, the reference numeral 401 shows the brightness of an image of the preceding frame, and 402 shows the brightness of an image of the current frame. The numeral 403 shows the brightness of an image prepared by using a large quantization coefficient to quantize the preceding frame image with the bright ness 401, and compressing and decompressing the resultant image. The numeral 404 shows the brightness of an image prepared by using a large quantization coefficient to quantize the current frame image with the brightness 402, and compressing and decompressing the resultant image. While according to the technique as described in JP-A-2007-025528, the quantization-threshold-vicinity-judging data is produced, it is assumed here that the grayscale level for which the quantization-threshold-vicinity-judging data is true falls in a range shown by a thick solid line 501 as shown in FIG. 5. Then, the quantization-threshold-vicinity-judging data is false outside the range shown by the thick solid line 501, and OD processing is performed in a portion where the brightness 403 of the preceding frame image after decompression does not coincide with the brightness 404 of the current frame image after decompression. As a result, the brightness of an image after OD processing contains noise as indicated by the numeral 502 in FIG. 5. Thus, a discontinuity of brightness arises in the gradation image, which is observed as a quantization noise.

The invention was made as a result of the study by the inventors as described above.

Therefore, it is an object of the invention to cut the storage capacity of a memory for storing the display grayscale level of the preceding frame for OD driving of a display driving circuit, thereby to reduce the deterioration of image quality.

The above and other objects of the invention and novel features thereof will be apparent from the description hereof and the accompanying drawings.

Of preferred embodiments herein disclosed, the representative one will be described below in brief.

A display driving circuit (101) according to the representative embodiment includes: an overdrive calculation circuit (114) which generates an overdrive activation signal for improving a response characteristic of an external display device (105) according to display image data; and a drive-output circuit (116) which supplies the overdrive activation signal to the display device.

The display driving circuit further includes a compression circuit (109) which stores compressed display data produced by compressing the display image data in a memory (110) (see FIG. 1).

The compression circuit includes: a DCT calculation module (202) which executes DCT (Discrete Cosine Transform) of the display image data; and an entropy coding module (205) which executes an variable length entropy coding of DCT conversion display data generated from an output of the DCT calculation module (see FIG. 2).

The effect that the above embodiment achieves is as follows in brief.

According to the invention, the storage capacity of a memory for storing a display grayscale level of the preceding frame for OD driving of the display driving circuit can be cut thereby to reduce the deterioration of image quality.

BRIEF DESCRIPTION OF THE DRAWINGS

FIGS. 8A-8H are a series of diagrams for explaining the basic principle of driving according to the overdrive (OD) technique;

FIG. 9 is a diagram showing the structure of the OD calculation circuit 114 included in the liquid crystal driving circuit 101 according to the first embodiment of the invention shown in FIG. 1;

FIG. 10 is a diagram showing a table for explaining the way the quantization-coefficient-control circuit 211 of the entropy coding module 205 of the compression block 109 shown in FIG. 2 decides a value of the quantization coefficient 207 of the subsequent frame in the liquid crystal driving circuit 101 according to the first embodiment of the invention shown in FIG. 1;

FIGS. 15A-15H are a series of diagrams showing how the change in compression ratio varies a decode image according to the picture-coding-and-decoding method.

DETAILED DESCRIPTION

1. Summary of the Embodiments

Figure 1:
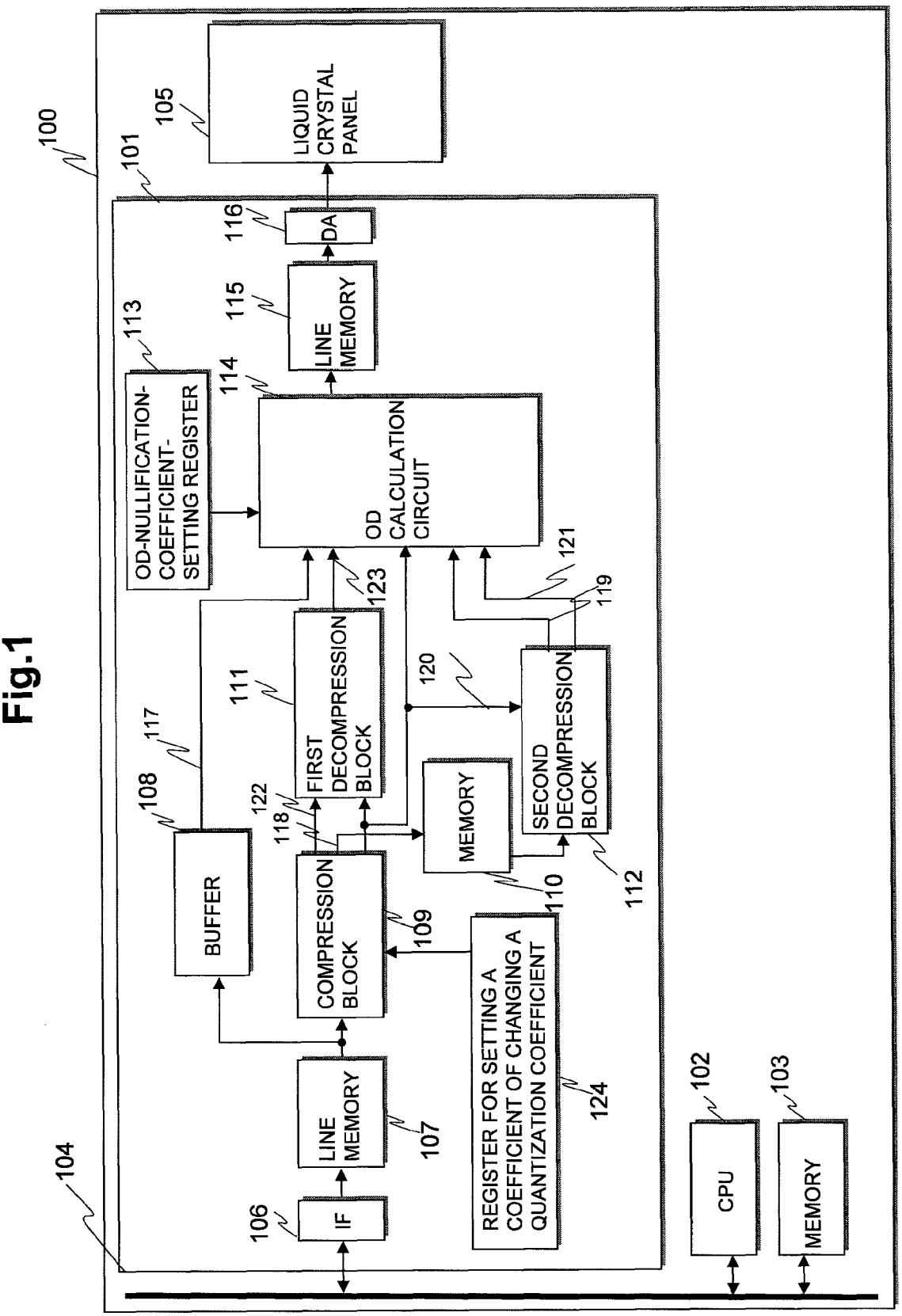
FIG. 1 is a diagram showing a structure of a display driving device according to the first embodiment of the invention.

The preferred embodiments herein disclosed will be outlined, first. Here, the reference numerals for reference to the drawings, which are accompanied with paired round brackets, only exemplify what the concepts of members or components referred to by the numerals contain.

[1] The display driving circuit (101) includes: an overdrive calculation circuit (114) which generates an overdrive activation signal for improving a response characteristic of an external display device (105) according to display image data; and a drive-output circuit (116) which supplies the overdrive activation signal to the display device.

The display driving circuit further includes: a compression circuit (109) operable to store compressed display data created by compressing the display image data in a memory (110) (see FIG. 1).

Figure 2:
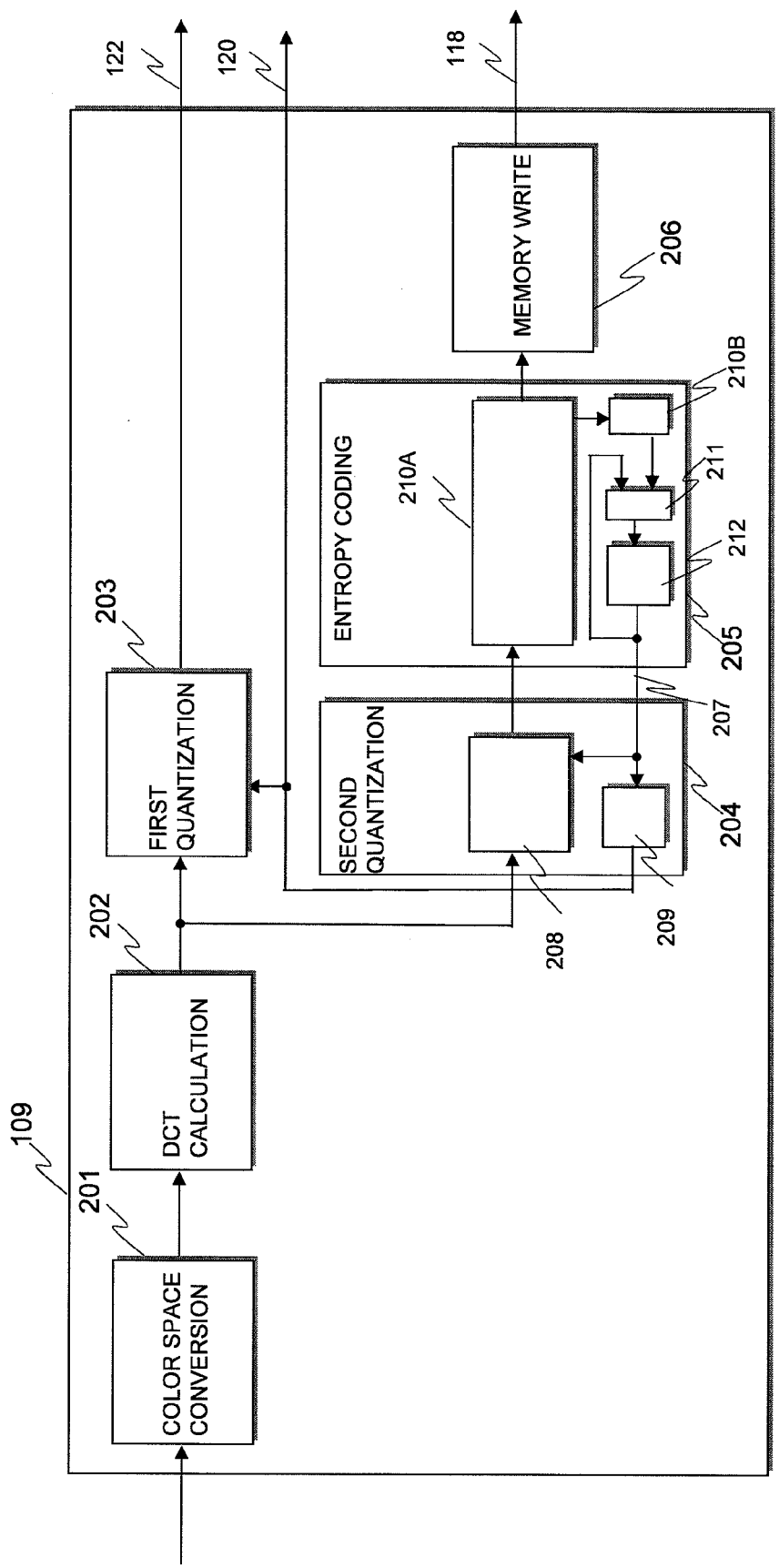
FIG. 2 is a diagram showing the structure of the compression block 109 of the liquid crystal driving circuit 101 according to the first embodiment of the invention shown in FIG. 1.
Figure 3:
FIG. 3 is a diagram showing a gradation image.

The compression circuit includes a DCT calculation module (202) operable to execute a discrete cosine transform of the display image data, and an entropy coding module (205) operable to execute a variable length entropy coding of DCT conversion display data arising through an output of the DCT calculation module (see FIG. 2).

According to the above-described embodiment, DCT conversion by the DCT calculation module (202) enables conversion of display image data of pixels into direct-current components and high-frequency components with high accuracy. In addition, the variable length entropy coding by the entropy coding module (205) allows DCT conversion display data to be converted into variable length code compressed data with a high data compression ratio with high accuracy. Thus, according to the invention, the following are made possible: to cut the storage capacity of a memory operable to store a display grayscale level of the preceding frame for OD (Overdrive) driving by the display driving circuit; and to lighten the deterioration of image quality.

According to a preferred embodiment of the invention, the display driving circuit further includes a decompression circuit (112) operable to supply the overdrive calculation circuit with decompressed display data (121) created by decompressing the compressed display data read out from the memory (see FIG. 1).

Figure 7:
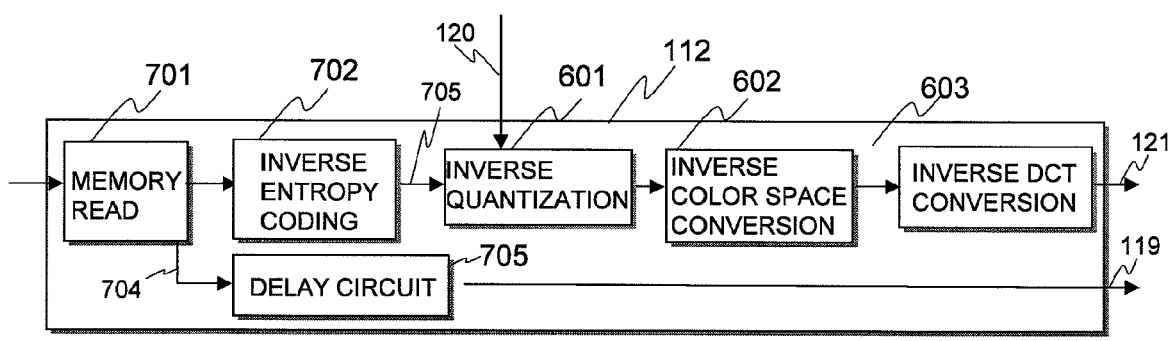
FIG. 7 is a diagram showing the structure of the second decompression block 112 included in the liquid crystal driving circuit 101 according to the first embodiment of the invention shown in FIG. 1.

The decompression circuit (112) includes: an inverse-entropy-coding circuit (702) operable to execute an inverse entropy coding, which is an inverse of the variable length entropy coding by the entropy coding module (205); and an inverse DCT conversion module (602) operable to execute an inverse DCT conversion, which is an inverse of the DCT conversion by the DCT calculation module (202) (see FIG. 7).

According to another preferred embodiment, the display driving circuit further includes an other decompression circuit (111) to which second DCT conversion display data (122) created by the DCT calculation module (202) of the compression circuit (109) can be supplied without passing through the memory (110) (see FIG. 1).

Figure 6:
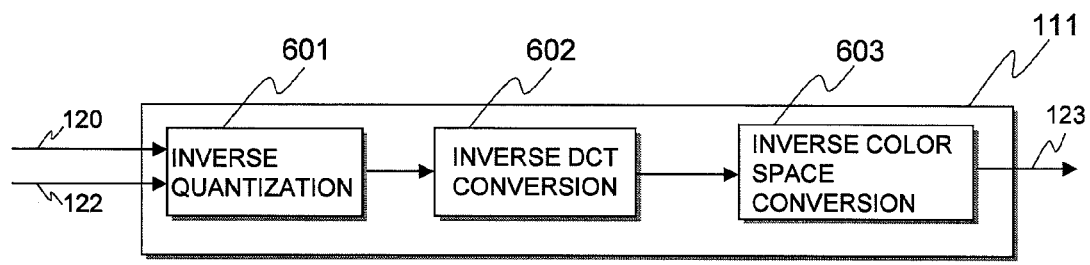
FIG. 6 is a diagram showing the structure of the first decompression block 111 included in the liquid crystal driving circuit 101 according to the first embodiment of the invention shown in FIG. 1.

The other decompression circuit (111) includes an other inverse DCT conversion module (602) operable to execute an other inverse DCT conversion, which is an inverse of the DCT conversion by the DCT calculation module (202) (see FIG. 6).

Other decompressed display data (123) arising from an output of the other decompression circuit (111) are supplied to the overdrive calculation circuit (see FIG. 1).

According to a more preferred embodiment, the other decompressed display data (123) arising from the output of the other decompression circuit (111) in connection with display image data of a current frame can be supplied to the overdrive calculation circuit.

The decompressed display data (121) created by the decompression circuit (112) in connection with display image data of the preceding frame read out from the memory are supplied to the overdrive calculation circuit.

According to another more preferred embodiment, the compression circuit (109) includes: a first quantization module (203) and a second quantization module (204), which are connected with an output of the DCT calculation module (202).

An output signal (122) arising from an output of the first quantization module (203) is supplied to the other decompression circuit (111) without passing through the memory (110).

An output signal arising from an output of the second quantization module (204) is supplied to an input of the entropy coding module (205) (see FIG. 2).

The other decompression circuit (111) includes a first inverse quantization module (601) having an output connected with an input of the other inverse DCT conversion module (602), and having an input to which the output signal (122) generated by the first quantization module (203) of the compression circuit (109) is supplied (see FIG. 6).

The decompression circuit (112) includes a second inverse quantization module (601) having an input connected with an output of the inverse-entropy-coding circuit (702), and having an output connected with an input of the inverse DCT conversion module (602) (see FIG. 7).

According to a specific embodiment of the invention, a quantization coefficient (207) supplied to the second quantization module (204) of the compression circuit (109) is set by comparing a bit number of compressed data of one frame of the entropy coding module (205) of the compression circuit (109) with a target compressed data amount.

An other quantization coefficient (120) supplied to the first quantization module (203) of the compression circuit (109), the first inverse quantization module (601) of the other decompression circuit (111), and the second inverse quantization module (601) of the decompression circuit (112) is a value gained by delaying the quantization coefficient (207) by one frame of time (see FIG. 2).

Figure 13:
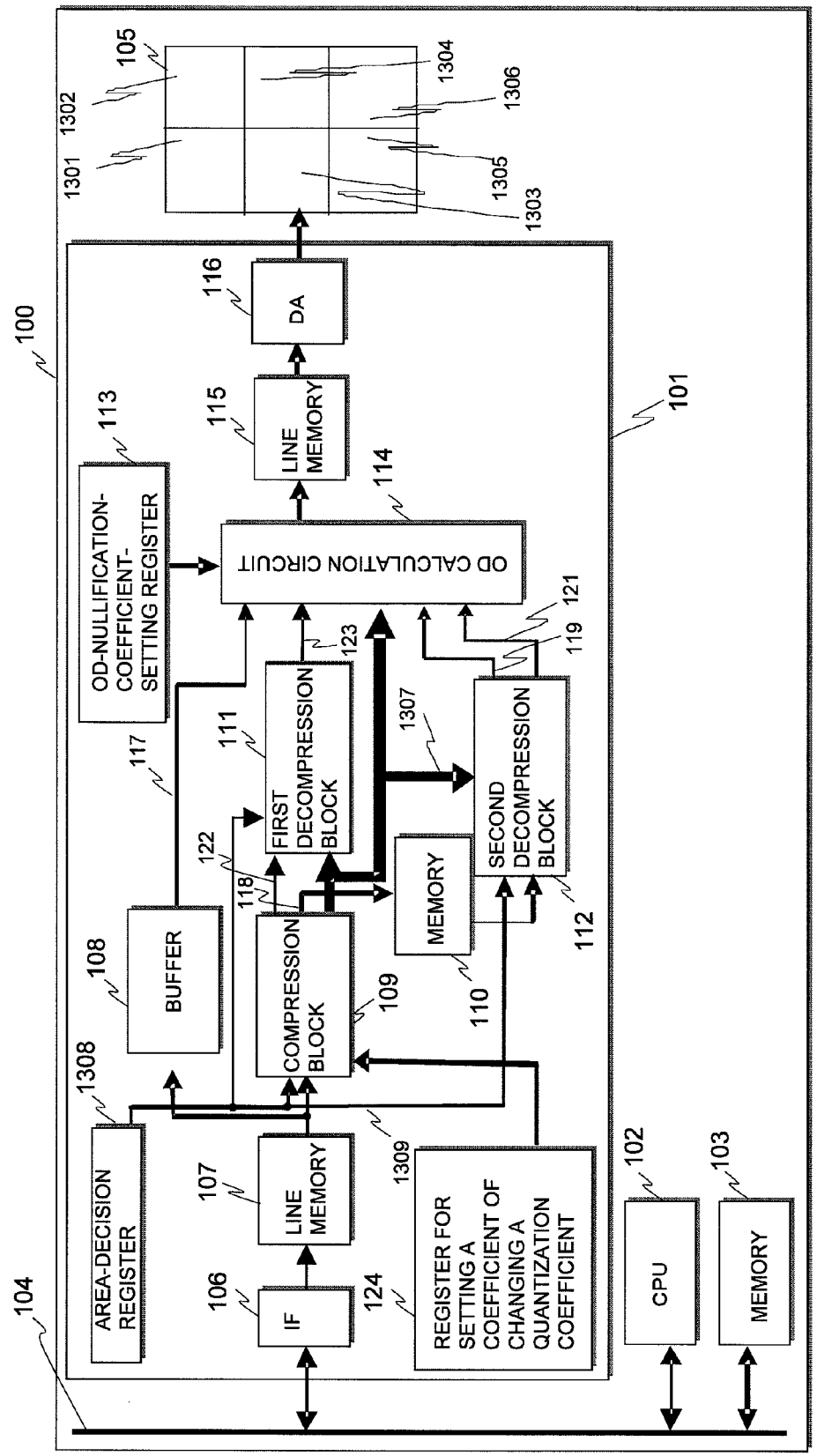
FIG. 13 is a diagram showing the structure of a display driving device according to the second embodiment of the invention.

According to more specific embodiment of the invention, the display driving circuit is capable of independently setting the other quantization coefficient for each display area of a plurality of display areas (1301-1306) of the display device (105) (see FIG. 13).

Figure 14:
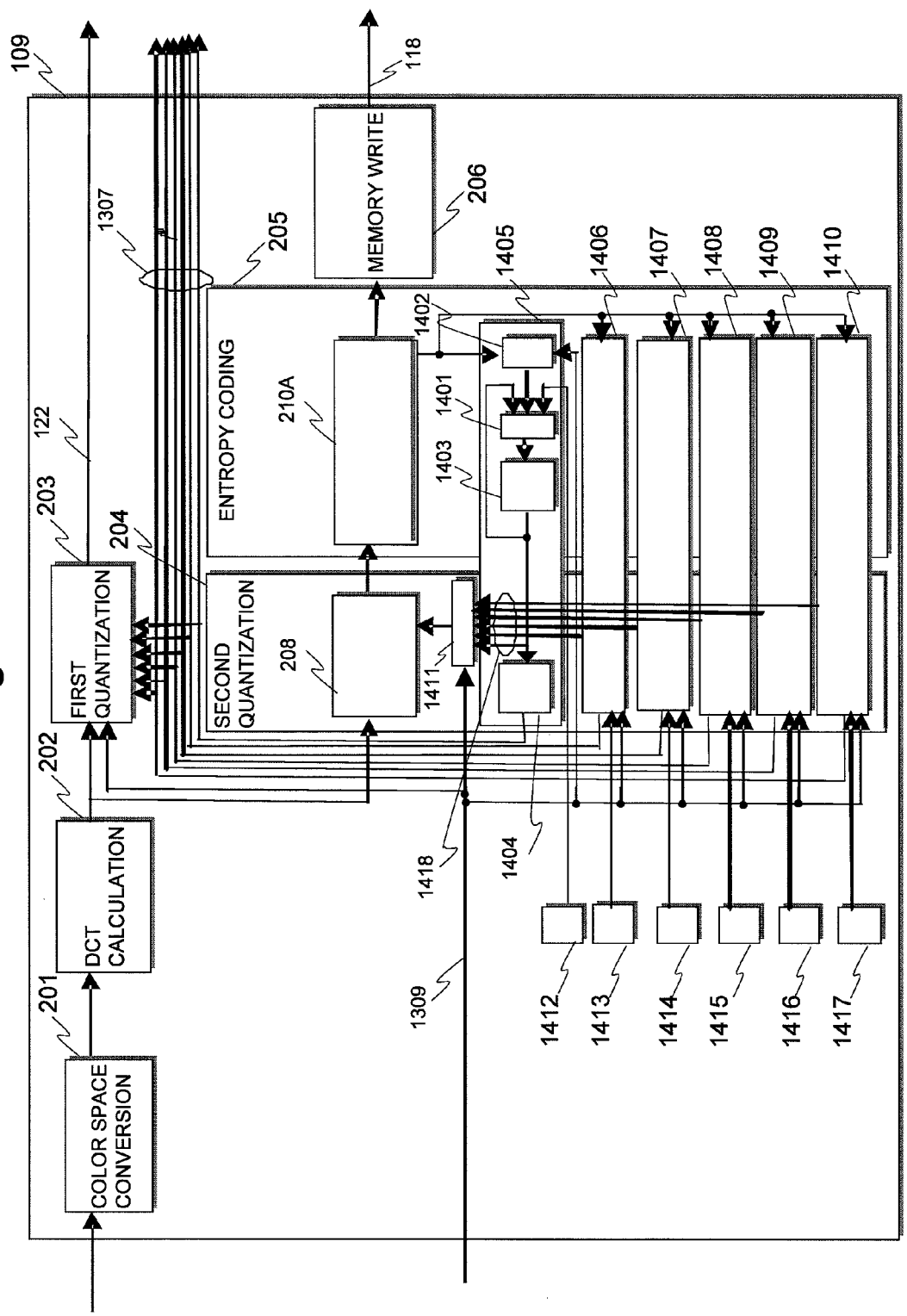
FIG. 14 is a diagram showing the structure of the compression block 109 of the liquid crystal driving circuit 101 according to the second embodiment of the invention shown in FIG. 13.

According to another more specific embodiment of the invention, the compression circuit (109) includes a plurality of registers (1412-1417) for independently setting the other quantization coefficient for each display area of the plurality of display areas of the display device (see FIG. 14).

According to the most specific embodiment of the invention, the other quantization coefficient (120) is supplied to the overdrive calculation circuit (114), whereby the overdrive calculation circuit (114) selects, as an output of the overdrive calculation circuit (114), one of the overdrive activation signal generated by the overdrive calculation circuit (114) and the display image data of the current frame according to an absolute value of a difference between the other decompressed display data (123) arising from the output of the other decompression circuit (111), which is compressed and decompressed data of the current frame, and the decompressed display data (121) created by the decompression circuit (112) as compressed and decompressed data of the preceding frame (see FIG. 9).

2. Further Detailed Description of the Embodiments

Here, the further detailed descriptions of the preferred embodiments are presented, in which the forms for embodying the invention will be described in detail with reference to the drawings. It is noted that in all the drawings for describing the forms for embodying the invention, like members or components having the same function are identified by the same reference character, and the repeated description thereof is omitted.

First Embodiment

Structure of the Display Driving Device

FIG. 1 is a diagram showing a structure of a display driving device according to the first embodiment of the invention.

In the drawing, the reference numeral 100 denotes a mobile terminal device; 105 denotes a liquid crystal panel, which is a display module of the mobile terminal device 100; 101 denotes a liquid crystal driving circuit which drives the liquid crystal panel 105; 102 denotes a CPU (Central Processing Unit) which controls the mobile terminal device 100; 103 denotes a memory for temporarily storing display data, etc.; and 104 denotes an internal bus which connects with CPU 102, the memory 103 and the liquid crystal driving circuit 101, and which enables mutual data transfer among them.

The liquid crystal driving circuit 101 includes: an interface circuit 106 serving to receive a display image, a command for display, etc. through the internal bus 104; a line memory 107 for arrangement of an input image in the order of a data array proper for compression; a buffer 108 which temporarily stores a received display image, and outputs the stored display image while controlling the timing of output; a compression block 109 which compresses display data; a register 124 for setting a coefficient of changing a quantization coefficient; a memory 110 for storing compressed data representing one frame; a first decompression block 111 which decompresses compressed data 122 of a current frame compressed by the compression block 109; a second decompression block 112 which decompresses compressed data of the preceding frame read out from the memory 110; an OD calculation circuit 114; an OD-nullification-coefficient-setting register 113 which stores a set value for deciding a nonexecutable range of OD processing in the OD calculation circuit 114 according to a quantization coefficient 120, which is an output of the compression block 109; a line memory 115 for arranging data of an array proper for compression into an array proper to drive liquid crystal; and a digital-to-analog converter 116 which converts digital data after OD processing to analog signals for driving liquid crystal. Particularly, the OD calculation circuit 114 executes OD processing using: input display data 117 of the current frame, which is an output of the buffer 108; a display image 123 of the current frame after compression and decompression, which is an output of the first decompression block 111; and display image 121 of the preceding frame after compression and decompression, which is an output of the second decompression block 112.

The mobile terminal device 100 is a portable electronic device, e.g. a battery-driven PC (Personal Computer), a cellular telephone, a PDA (Personal Digital Assistant), a portable game machine, or a portable digital movie camera. In a portable electronic device like this, MPEG moving-image-decode bitstreams of one-segment television broadcasting and others from a MPEG decoder are stored in the memory 103 for temporarily storing display data, and still image display data generated by CPU 102 are also stored in the memory 103 for temporarily storing display data.

Still image display data and MPEG moving-image-decode bitstreams, which are stored in the storing memory 103, are read out by CPU 102, and supplied to the interface circuit 106 of the liquid crystal driving circuit 101. The liquid crystal panel 105 is driven by an analog signal for driving liquid crystal, which is an output of the digital-to-analog converter 116 of the liquid crystal driving circuit 101, and thus the liquid crystal panel 105 is allowed to display a still image and a moving image thereon.

As to the capacity of the memory 110 used for OD driving, if a relatively small capacity is sufficient, the memory 110 can be integrated into a semiconductor chip as a built-in memory of a semiconductor integrated circuit included in the liquid crystal driving circuit 101. In contrast, if the memory 110 is required to have a relatively large capacity, the memory 110 is arranged as an external memory outside the semiconductor integrated circuit included in the liquid crystal driving circuit 101. As the external memory, SDRAM (Synchronous Dynamic Random Access Memory) may be used.

Data compression by the DCT conversion and entropy coding, and data decompression by the inverse DCT conversion and inverse entropy coding are conducted in the display driving circuit 101 to reduce the storage capacity of the memory 110 for storing a display grayscale level of the preceding frame for OD driving by the OD calculation circuit 114 of the display driving circuit 101 for improvement of the response characteristic of the liquid crystal panel 105, the details of which are to be described later.

However, it is noted that attention must be paid not to confuse the DCT conversion and entropy coding for reducing the memory storage capacity in OD driving according to the invention with the DCT conversion and entropy coding of MPEG moving-image coding and the inverse DCT conversion and inverse entropy coding of MPEG moving-image decoding, which have been well known conventionally.

<<Action for Compression and Decompression>>

Next, the actions for compression and decompression that the display driving device according to the first embodiment of the invention performs, which is shown in FIG. 1, will be described.

In general, a horizontal line of display image is input to the liquid crystal driving circuit 101 sequentially. The array of the display image is transformed so that data of a rectangular display image of pixels of m rows and n columns are processed as a unit of compression in the line memory 107. The possible sizes of data to be compressed are 4-row×4-column pixels, 8-row×8-column pixels, 16-row×16-column pixels, 2-row×2-column pixels, and 4-row×1-column pixels. Now, it is noted that the invention is not limited to the data sizes as described above, other data size may be adopted.

<<Compression Block>>

FIG. 2 is a diagram showing the structure of the compression block 109 of the liquid crystal driving circuit 101 according to the first embodiment of the invention shown in FIG. 1.

Display data, which have undergone data arrangement conversion to a compression-processing-data size, are input to a color-space-conversion module 201 of the compression block 109 shown in FIG. 2. In the color-space-conversion module 201, the data are converted to a color space proper for compression. The color space proper for compression includes YCbCr color space and YCoCg color space. The applicability of the invention is independent of the type of a color space, and the invention can be applied to any color space, although in the description here, use of YCoCg color space is assumed as an example. In the color-space-conversion module 201, the conversion presented by the following Equation (1) is performed on respective pixel values presented by R, G and B.

$$\begin{cases} Y = (R + 2*G + B)/4 \\ Co = (R - B)/2 \\ Cg = (-R + 2*G - B)/4 \end{cases} \quad (1)$$

The DCT calculation module 202 executes DCT calculation on display data subjected to color space conversion by the color-space-conversion module 201. The DCT conversion is a process of converting discrete image data of an image into frequency components. In general, in DCT conversion, a natural image goes through data compression making use of the fact that high-frequency components other than direct current components have a very small value. The DCT conversion is a matrix operation, and the size of data subjected to data compression is identical with the size of a matrix that the matrix operation involves. The invention is not limited to the size of a matrix that DCT conversion involves, and a matrix of DCT conversion may have any size. It is assumed here that DCT calculation is executed with the size of 4-row×4-column pixels, which is just an example. In this calculation, the DCT calculation module 202 performs DCT conversion given by:

$$\begin{cases} Z = HXH^T & (2) \\ H = \begin{bmatrix} \frac{1}{2} & \frac{1}{2} & \frac{1}{2} & \frac{1}{2} \\ \frac{2}{\sqrt{10}} & \frac{1}{\sqrt{10}} & \frac{-1}{\sqrt{10}} & \frac{-2}{\sqrt{10}} \\ \frac{1}{2} & \frac{-1}{2} & \frac{-1}{2} & \frac{1}{2} \\ \frac{1}{\sqrt{10}} & \frac{-2}{\sqrt{10}} & \frac{2}{\sqrt{10}} & \frac{-1}{\sqrt{10}} \end{bmatrix} \end{cases}$$

where X is a matrix of an input grayscale level value of 4 pixels×4 pixels, and Z is a result of DCT. The DCT calculation is executed on each of the brightness component Y, and color components Co and Cg independently.

The display data subjected to DCT conversion by the DCT calculation module 202 are quantized by first and second quantization modules 203 and 204. The quantization is a process of dividing a DCT-converted value by a value referred to as "quantization coefficient". The DCT-converted value is made smaller by the division and the compression of display data is thus executed. Specifically, the first quantization module 203 performs the quantization using a quantization coefficient 120, whereas the second quantization module 204 conducts the quantization using a quantization coefficient 207. The divider 208 in the second quantization module 204 divides a result of DCT calculation, which the DCT calculation module 202 has output, by the quantization coefficient 207 supplied from the entropy coding circuit 205. The latch circuit 209 in the second quantization module 204 latches a value of the quantization coefficient 207 supplied from the entropy coding circuit 205 at the top of a frame, and holds the value for the period of one frame. As the latch circuit 209 latches the quantization coefficient 207, the value of the quantization coefficient 120 output by the latch circuit 209 coincides with the value of the quantization coefficient 207 delayed by one frame. Further, the first compressed data 122, which is an output of the first quantization module 203, is supplied to the first decompression block 111. An output of the second quantization module 204 is input to the entropy coding module 205.

The coding module 210A in the entropy coding module 205 executes entropy coding. The entropy coding is a coding method, by which data compression is conducted by assigning a short code length to a code with a large appearance probability, and a long code length to a code with a small appearance probability according to the appearance probabilities of codes. Examples known as the entropy coding include Huffman coding and Exponential Golomb coding. In regard to display data, which have been DCT-converted and quantized, a code of a smaller absolute value has a higher appearance probability, and therefore a code with a smaller absolute value is assigned a code length of a shorter bit length. The second compressed data 118, which have been subjected to the entropy coding like this, are written in the memory 110 of the liquid crystal driving circuit 101 according to the first embodiment of the invention shown in FIG. 1 under the control of the memory-write module 206. The data compression by the entropy coding using Exponential Golomb codes will be later described in detail.

In the entropy coding module 205 of the compression block 109 shown in FIG. 2, the counter 210B counts the number of bits of display image compressed data of one frame after entropy coding. Then, at the beginning of the subsequent frame, the quantization-coefficient-control circuit 211 compares the number of bits of display image compressed data of one frame after entropy coding with a target bit number of compressed data, which depends on the size of the memory 110. Following the above steps, the entropy coding module 205 controls the quantization coefficient 207 of the subsequent frame, as shown in FIG. 10.

FIG. 10 is a diagram showing a table for explaining the way the quantization-coefficient-control circuit 211 of the entropy coding module 205 of the compression block 109 shown in FIG. 2 decides a value of the quantization coefficient 207 of the subsequent frame in the liquid crystal driving circuit 101 according to the first embodiment of the invention shown in FIG. 1.

The left column of the table of FIG. 10 shows the relation between the number of bits of compressed data of one frame after entropy coding, and a target bit number of compressed data. The right column of the table of FIG. 10 shows a value of the quantization coefficient 207 of the subsequent frame decided by the quantization-coefficient-control circuit 211.

Specifically, on condition that the number of bits of entropy-coded compressed data of one frame is larger than a target bit number of compressed data, the quantization-coefficient-control circuit 211 controls the quantization coefficient 207 in connection with the subsequent frame to be a larger value, shown in the first row of the table of FIG. 10. Further, on condition that the number of bits of entropy-coded compressed data of one frame is sufficiently smaller than a target bit number of compressed data, the quantization-coefficient-control circuit 211 controls the quantization coefficient 207 in connection with the subsequent frame to be a smaller value, as shown in the second and latter rows of the table of FIG. 10. Under the control of the quantization coefficient 207 by the quantization-coefficient-control circuit 211 like this, the quantization coefficient can be set to a smaller value in regard to an image with less change in brightness and fewer color variations, which is referred to as "solid image" and a simple image with fewer edges, for example. In contrast, with regard to a complicated image with many changes in brightness and lots of edges, the quantization coefficient can be set to a larger value, under the control of the quantization coefficient 207 by the quantization-coefficient-control circuit 211, whereby a display image data of a complicated image, which has a large amount of data, can be compressed to a data size which allows the data to be stored in the memory 110.

In general, moving images have a strong correlation between frames, and therefore the quantization coefficient 207 can be controlled to take an effective value by estimating a quantization coefficient of the subsequent frame based on an image of the current frame. In addition, even if a large change of an image causes some moving-image blurring, such blurring never poses a major problem. This is because human eyes cannot follow a moving image in hundreds of microseconds. As to the parameters $\alpha$, $\beta$, $\gamma$, and $\phi$ in the table of FIG. 10, a user can set appropriate values on the register 124 for setting a coefficient of changing a quantization coefficient, which the liquid crystal driving circuit 101 according to the first embodiment of the invention shown in FIG. 1 includes. Thus, the speed of convergence of the quantization coefficient 207 can be controlled optimally.

Further, in the entropy coding module 205 of the compression block 109 shown in FIG. 2, the latch circuit 212 connected with an output of the quantization-coefficient-control circuit 211 has the function of holding the quantization coefficient 207 for the period of one frame. Therefore, the quantization coefficient 120 output by the latch circuit 209 in the second quantization module 204 takes a value equal to the quantization coefficient 207 delayed by one frame of time. Consequently, the quantization coefficient 207 is used in quantization by the second quantization module 204 of the compression block 109 shown in FIG. 2 before writing on the memory 110. On the other hand, by using the quantization coefficient 120 in compression and quantization of the current frame in the first quantization module 203 of the compression block 109 shown in FIG. 2, decompression of the current frame in the first decompression block 111, and decompression of data read out from the memory 110 in the second decompression block 112, it becomes possible to use the same quantization coefficient 120 commonly both in compression and in decompression.

<<First Decompression Block>>

FIG. 6 is a diagram showing the structure of the first decompression block 111 included in the liquid crystal driving circuit 101 according to the first embodiment of the invention shown in FIG. 1.

In the first decompression block 111 shown in FIG. 6, the inverse quantization circuit 601 multiplies the compressed data 122 by the quantization coefficient 120, thereby to conduct an inverse quantization, and the inverse DCT conversion block 602 executes an inverse DCT conversion. On condition that the DCT conversion is a 4-pixel-square conversion as shown by the Equation (2), the inverse conversion can be performed by execution of the conversion given by the following Equation (3)

$$Z = H^T X H \quad (3)$$

where the matrix H is identical with the matrix H used in Equation (2), X is a 4×4 matrix before inverse DCT conversion, and Z is a 4×4 matrix after inverse DCT conversion.

The inverse-color-space-conversion circuit 603 of the first decompression block 111 shown in FIG. 6 performs an inverse conversion of data of YCbCr color space, YCoCg color space and the like into RGB color space for display on a liquid crystal display. In the case of YCoCg color space, the conversion given by the following Equation (4) is performed.

$$\begin{cases} R = Y + Co - Cg \\ G = Y + Cg \\ B = Y - Co - Cg \end{cases} \quad (4)$$

<<Second Decompression Block>>

FIG. 7 is a diagram showing the structure of the second decompression block 112 included in the liquid crystal driving circuit 101 according to the first embodiment of the invention shown in FIG. 1.

In the second decompression block 112 of FIG. 7, the memory-read module 701 reads out compressed data from the memory 110, the inverse-entropy-coding circuit 702 performs an inverse entropy coding of an entropy code thereby to create compressed numeric data 705, and the inverse quantization circuit 601 multiplies the compressed data 705 by the quantization coefficient 120 thereby to conduct the inverse quantization. Further, the inverse DCT conversion block 602 executes inverse DCT conversion, and the inverse-color-space-conversion circuit 603 conducts inverse-color-space conversion of data of e.g. YCbCr color space or YCoCg color space thereby to perform an inverse conversion to RGB color space for display on a liquid crystal display. The memory-read module 701 initializes an end-of-memory signal 704 to "0" at the beginning of one frame. When reaching an end address of the memory 110 before completion of reading of data of one frame, the memory-read module 701 controls the end-of-memory signal 704 to "1". The end-of-memory signal 704 is delayed by the delay circuit 703, and is synchronized with the timing of a pixel read from the memory 110 and decompressed, and is output as an end-of-frame-memory signal 119. For instance, when the size of a display image changes largely, a data amount after compression becomes larger than a target data amount (memory size) in the liquid crystal driving circuit 101 according to the first embodiment of the invention in some cases. In such cases, data of one frame are not stored in the memory 110, and the memory-read module 701 can reach the end address of the memory 110 before completion of reading of data of one frame. In such a situation, the end-of-frame-memory signal 119 is made valid.

<<OD Calculation Circuit>>

FIG. 9 is a diagram showing the structure of the OD calculation circuit 114 included in the liquid crystal driving circuit 101 according to the first embodiment of the invention shown in FIG. 1.

The OD calculation circuit 114 shown in FIG. 9 includes: a calculation unit 901; a difference-calculation circuit 902; a comparator 903; a lookup table (LUT) 904; an adder 905; and a selector 906.

The calculation unit 901 calculates a grayscale level difference for disabling the function of OD processing from the quantization coefficient 120 output by the latch circuit 209 in the second quantization module 204 of the compression block 109 shown in FIG. 2, and a value set on the OD-nullification-coefficient-setting register 113.

The difference-calculation circuit 902 calculates an absolute value of the difference between display data 123 of the current frame after compression and decompression supplied from an output of the first decompression block 111, and display data 121 of the preceding frame after compression and decompression supplied through an output of the second decompression block 112.

The comparator 903 compares a grayscale level value for disabling OD function, which is an output value of the calculation unit 901, with an output value of the difference-calculation circuit 902. Specifically, the comparator 903 outputs a comparison-output signal of High level "1" in the case of an output value of the difference-calculation circuit 902 larger than an output value of the calculation unit 901, or otherwise outputs an comparison-output signal of Low level "0".

The lookup table (LUT) 904 accepts the display data 121 of the preceding frame after compression and decompression, which are supplied through the output of the second decompression block 112, and input display data 117 of the current frame supplied through an output of the buffer 108, and outputs an adequate correction amount 803 for OD driving.

The adder 905 adds up the correction amount 803 output by the lookup table (LUT) 904, and input display data 117 of the current frame supplied through the output of the buffer 108, thereby to output OD-driving grayscale level data.

On condition that the output of the comparator 903 is at High level "1" (i.e. the absolute value of the difference between display data 123 of the current frame after compression and decompression, supplied by the first decompression block 111, and display data 121 of the preceding frame after compression and decompression, supplied by the second decompression block 112 is larger than the grayscale level value for disabling OD function which is an output value of the calculation unit 901), and the end-of-frame-memory signal 119 is at Low level "0" (i.e. the storage of decompressed image data of the preceding frame has not reached the end address of the memory 110), the selector 906 selects OD-driving grayscale level data, which is an output of the adder 905, as an output of the OD calculation circuit 114. However, on condition that the output of the comparator 903 is at Low level "0" (i.e. the absolute value of the difference between display data 123 of the current frame after compression and decompression, supplied by the first decompression block 111, and display data 121 of the preceding frame after compression and decompression, supplied by the second decompression block 112 is smaller than the grayscale level value for disabling OD function which is an output value of the calculation unit 901), or the end-of-frame-memory signal 119 is at High level "1" (i.e. the storage of decompressed image data of the preceding frame has reached the end address of the memory 110), the selector 906 selects input display data 117 of the current frame, supplied through the output of the buffer 108 as an output of the OD calculation circuit 114.

<<Generation of a Decode Image>>

In the liquid crystal driving circuit 101 according to the first embodiment of the invention, for which the structures as described above with reference to FIGS. 1, 2, and 6 to 9 are adopted, the compression block 109 conducts data compression by DCT conversion, quantization and entropy coding, the first decompression block 111 executes data decompression by inverse quantization and inverse DCT conversion, and the second decompression block 112 performs data decompression by inverse entropy coding, inverse quantization and inverse DCT conversion.

Thus, it becomes possible to form a decode image with less deterioration of image by the liquid crystal driving circuit 101 according to the first embodiment of the invention.

For instance, it is assumed that an original image having the gradation image as shown in FIG. 15A is displayed on the liquid crystal panel 105 taking advantage of compression and decompression by the liquid crystal driving circuit 101 according to the first embodiment of the invention. In this example, the original image shown in FIG. 15A includes a plurality of pixels 1501, and specifically it is an image having a structure of 4×4 pixels' square. FIG. 15B shows the grayscale level value of each pixel of the original image of FIG. 15A.

When the DCT conversion given by the Equation (2) is executed on the grayscale level values of the pixels shown in FIG. 15B, followed by quantization using a quantization parameter of 64, image data shown in FIG. 15F can be obtained. The image data shown in FIG. 15F consist of three types of "8", "3" and "0".

Subsequently, the image data shown in FIG. 15F are coded using Exponential Golomb codes. Exponential Golomb code is a universal code adopted for highly efficient entropy coding (variable length coding) of a syntax element, which is a piece of information conveyed by a syntax such as a DCT coefficient or a motion vector according to MPEG-4AVC (H.264), which is one of international standard moving-image-coding methods mentioned in the beginning hereof.

Exponential Golomb codes have a structure consisting of a prefix (successive 0's)+separator (one bit of "1")+suffix ("0" or "1" or a combination of "0" and "1"), in which the prefix and suffix are the same in length. Therefore, the relation between Exponential Golomb codes and code numbers is as follows.

| EXPONENTIAL GOLOMB CODE | CODE NUMBER |
|---|---|
| 1 | 0 |
| 010 | 1 |
| 011 | 2 |
| 00100 | 3 |
| 00101 | 4 |
| 00110 | 5 |
| 00111 | 6 |
| 0001000 | 7 |
| 0001001 | 8 |
| 0001010 | 9 |
| ... | ... |

The value of each Exponential Golomb code is expressed by a number of bits presented by the following Equation:

$$Ib = 2 \log_2(x+1) + 1 \qquad (5)$$

where x is a code number, and Ib is the number of bits of each Exponential Golomb code.

As described above, the code number "8" consists of 7 bits, "3" consists of 5 bits, and "0" consists of 1 bit, and therefore all of the image data shown in FIG. 15F can be saved with 32 bits.

When the inverse quantization is executed by multiplying image data shown in FIG. 15F, which has been coded with the above Exponential Golomb codes, by the inverse quantization parameter of 64, and then the inverse DCT conversion is performed according to the Equation (3), decompressed and restored data of FIG. 15G is created. FIG. 15H shows a decode image formed by directly using the decompressed and restored data shown by FIG. 15G. The decode image of FIG. 15H makes a display image having a remarkable similarity to the original image of FIG. 15A. The sum of the squared errors between pixel values of the decompressed and restored data of FIG. 15G and corresponding grayscale level values of the original image of FIG. 15B equals to 2161, which is remarkably small. Therefore, it can be seen that the error caused by the method using the liquid crystal driving circuit 101 according to the first embodiment of the invention is remarkably small in comparison to the method including removing lower-order bits.

<<Operation to Display an Image on the Liquid Crystal Panel>>

Next, an operation to display an image on the liquid crystal panel 105 while using the liquid crystal driving circuit 101 according to the first embodiment of the invention, for which the structures as described above with reference to FIGS. 1, 2, and 6 to 9 are adopted, will be described.

Figure 11:
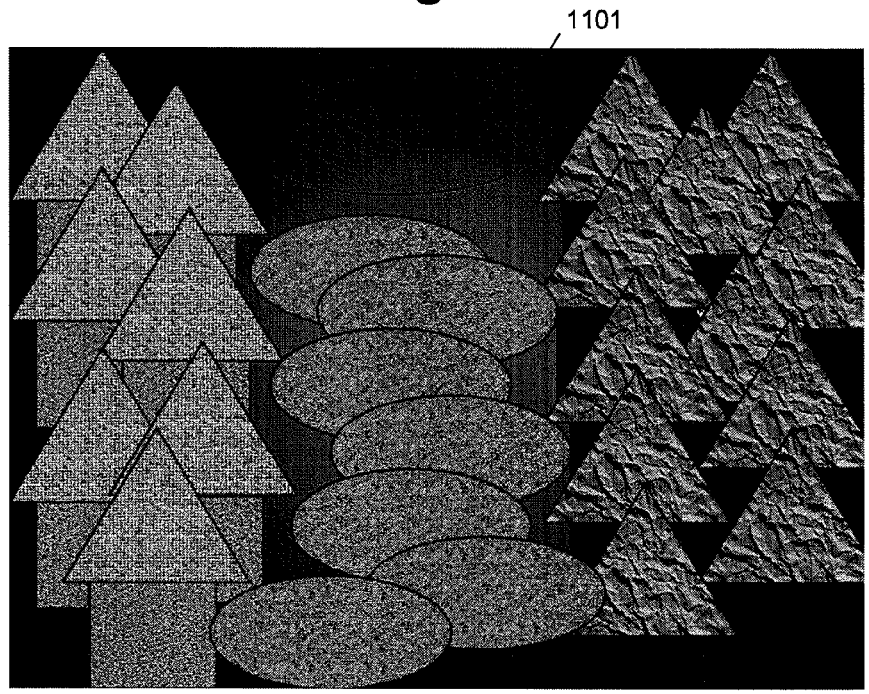
FIG. 11 is a diagram showing an image displayed on the liquid crystal panel 105 by an image display operation by the liquid crystal driving circuit 101 according to the first embodiment of the invention, for which the structures as described above with reference to FIGS. 1, 2, and 6 to 9 are adopted.

It is assumed here that CPU 102 included in the mobile terminal device 100 having the liquid crystal driving circuit 101 according to the first embodiment of the invention shown in FIG. 1 displays e.g. a display image as shown in FIG. 11 on the liquid crystal panel 105 while scanning the display image.

FIG. 11 is a diagram showing an image displayed on the liquid crystal panel 105 by an image display operation by the liquid crystal driving circuit 101 according to the first embodiment of the invention, for which the structures as described above with reference to FIGS. 1, 2, and 6 to 9 are adopted.

The image shown in FIG. 11 includes lots of complicated edges and gradation parts 1101, and therefore the quantization coefficient takes a large value. For instance, it is assumed here that a very simple image is input and a small quantization coefficient is set before input of a display image shown in FIG. 11.

Figure 12:
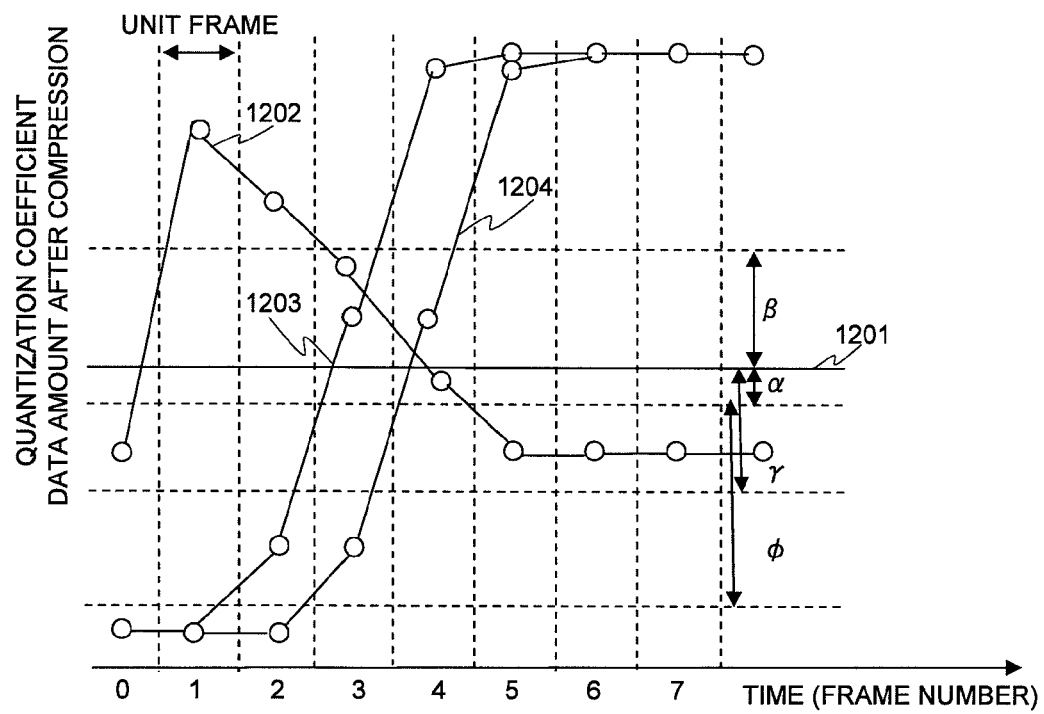
FIG. 12 is a diagram showing changes of the amount of data after compression, and the quantization coefficients between the time when a very simple image is input to the liquid crystal driving circuit 101 according to the first embodiment of the invention, for which the structures as described above with reference to FIGS. 1, 2, and 6 to 9 are adopted, and the time when supply of an image including lots of complicated edges as shown in FIG. 11 is started.

FIG. 12 is a diagram showing changes of the amount of data after compression, and the quantization coefficients between the time when a very simple image is input to the liquid crystal driving circuit 101 according to the first embodiment of the invention, for which the structures as described above with reference to FIGS. 1, 2, and 6 to 9 are adopted, and the time when supply of an image including lots of complicated edges as shown in FIG. 11 is started.

In FIG. 12, a zone partitioned by adjacent two dotted lines along a horizontal direction corresponds to one frame of time, the curve 1202 represents an amount of data after compression, which includes DCT conversion, quantization and entropy coding in the compression block 109 of the liquid crystal driving circuit 101, the curve 1203 represents a value of the quantization coefficient 207 supplied by the entropy coding circuit 205 of the compression block 109, and the curve 1204 represents a value of the quantization coefficient 120 output by the latch circuit 209 of the second quantization module 204 in the compression block 109.

It is assumed here that a display image of the zeroth Frame is a simple image, and therefore even if the quantization coefficients 1203 and 1204 are set to small values, the after-compression data amount 1202 is below the target data amount 1201 minus α and above the target data amount 1201 minus γ as shown in FIG. 12, provided that the target data amount 1201 is equal to the memory size of the memory 110, and α<γ.

Next, it is assumed that the display image input by CPU 102 is changed to an image including lots of complicated edges as shown in FIG. 11 during the period of the first frame. In this case, the after-compression data amount 1202 rises above the target data amount 1201 plus β as shown in FIG. 12, provided the target data amount 1201 is the memory size of the memory 110. Then, the value of the quantization coefficient 207 to be used during the period of the second frame becomes substantially double the value of the quantization coefficient 207 in the period of the first frame as shown by the curve 1203. As the substantially doubled quantization coefficient is used to execute the compression, the after-compression data amount 1202 in the period of the second frame decreases in comparison to compressed data amount 1202 at compression during the period of the first frame, nevertheless the data amount 1202 is still above the target data amount 1201 plus β, and the value of the quantization coefficient 207 to be used during the period of the third frame becomes substantially double the value of the quantization coefficient 207 in the period of the second frame as shown by the curve 1203, provided that the target data amount 1201 is equal to the memory size of the memory 110.

The after-compression data amount 1202 is above the memory size 1201 in the period of the first frame, and therefore an image area with no compressed and decompressed data of the preceding frame is present at the time when the OD calculation circuit 114 calculates an OD driving grayscale level, and the second decompression block 112 outputs the end-of-frame-memory signal 119 for the image area with no compressed and decompressed data of the preceding frame. Then, the selector 906 of the OD calculation circuit 114 directly outputs the input display data 117, which is an output of the buffer 108, and thus the disorder of image or the like is not caused. In addition, even if a large change of an image causes a significant image blurring because the input display data is output directly, human eyes cannot follow such change of image, and therefore the viewer cannot recognize the image blurring or the like. On this account, an image with significant blurring, which has developed owing to a large change of an image, never makes a major problem.

When the after-compression data amount 1202 decreases below the target data amount 1201 plus β during the period of the fourth frame, the value of the quantization coefficient 207 is incremented by one as described in the second row of the table of FIG. 10, provided that the after-compression data amount 1201 is equal to the memory size of the memory 110.

Figure 4:
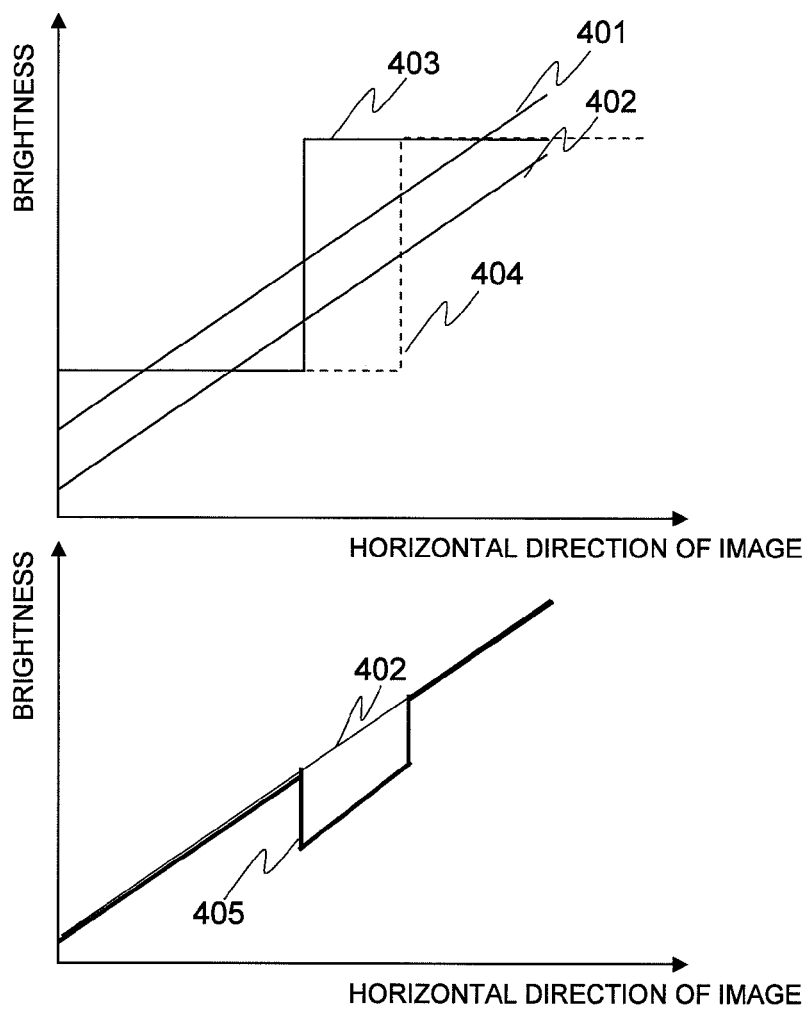
FIG. 4 is a diagram showing the change in brightness in the case of displaying the gradation image 301 shown by FIG. 3 while scanning in the right direction.
Figure 5:
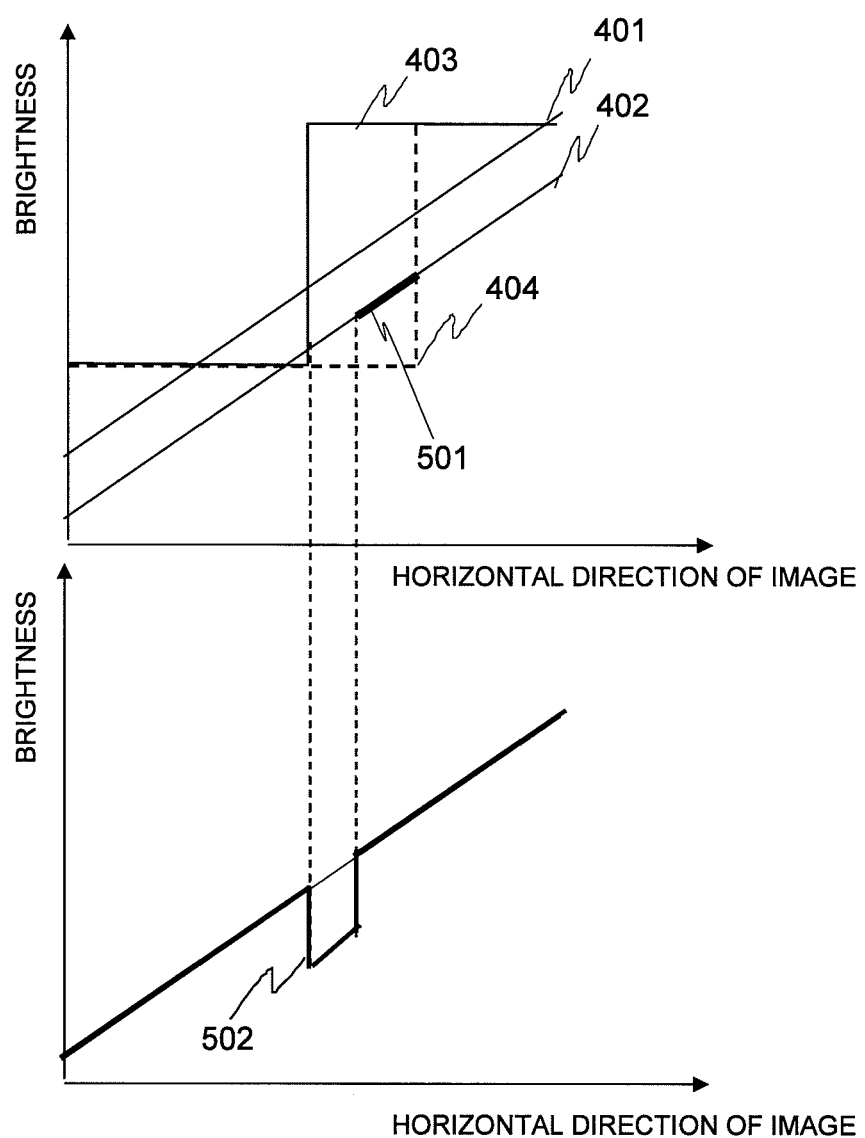
FIG. 5 is a diagram showing the change of brightness in the case of displaying the gradation image 301 shown in FIG. 3 while scanning in the right direction.

In case that the after-compression data amount 1202 decreases below the target data amount 1201 minus α and above the target data amount 1201 minus γ during the period of the fifth frame, the quantization coefficient 207 is kept unchanged as described in the third row of the table of FIG. 10, provided that the after-compression data amount 1201 is equal to the memory size of the memory 110. In this case, it is assumed that the quantization coefficient 207 is 65, for example. Further, it is also assumed that the gradation part 1101 in the image of FIG. 11 includes a pixel such that the value 403, which is quantized compressed data of the preceding frame, differs from the value 404, which is quantized compressed data of the current frame, as shown in FIG. 4.

Incidentally, the description here is presented on the following assumptions. The first is that the first compressed data 122 of the current frame of the pixel in question, which results from compression by the combination of the DCT calculation module 202 and first quantization module 203 of the compression block 109, is given by Equation (7). The second is that the second compressed data 118 of the preceding frame of the pixel in question, which is read out from the memory 110, and then subjected to the inverse entropy coding by the inverse-entropy-coding circuit 702 of the second decompression block 112, is given by Equation (6). Incidentally, the second compressed data 118 of the preceding frame of the pixel in question has been placed in the memory 110 after compression by the combination of the DCT calculation module 202, the second quantization module 204 and the entropy coding module 205 of the compression block 109.

$$Y = \begin{bmatrix} 10 & 0 & 0 & 0 \\ 0 & 0 & 0 & 0 \\ 0 & 0 & 0 & 0 \\ 0 & 0 & 0 & 0 \end{bmatrix} \quad (6)$$

$$Co = \begin{bmatrix} 0 & 0 & 0 & 0 \\ 0 & 0 & 0 & 0 \\ 0 & 0 & 0 & 0 \\ 0 & 0 & 0 & 0 \end{bmatrix}$$

$$Cg = \begin{bmatrix} 0 & 0 & 0 & 0 \\ 0 & 0 & 0 & 0 \\ 0 & 0 & 0 & 0 \\ 0 & 0 & 0 & 0 \end{bmatrix}$$

$$Y = \begin{bmatrix} 11 & 0 & 0 & 0 \\ 0 & 0 & 0 & 0 \\ 0 & 0 & 0 & 0 \\ 0 & 0 & 0 & 0 \end{bmatrix} \quad (7)$$

$$Co = \begin{bmatrix} 0 & 0 & 0 & 0 \\ 0 & 0 & 0 & 0 \\ 0 & 0 & 0 & 0 \\ 0 & 0 & 0 & 0 \end{bmatrix}$$

$$Cg = \begin{bmatrix} 0 & 0 & 0 & 0 \\ 0 & 0 & 0 & 0 \\ 0 & 0 & 0 & 0 \\ 0 & 0 & 0 & 0 \end{bmatrix}$$

The inverse quantization circuit 601 of the second decompression block 112 performs inverse-quantization on the inverse-entropy-coded data given by Equation (6) to create image data given by the following Equation (8):

$$Y = \begin{bmatrix} 650 & 0 & 0 & 0 \\ 0 & 0 & 0 & 0 \\ 0 & 0 & 0 & 0 \\ 0 & 0 & 0 & 0 \end{bmatrix} \quad (8)$$

$$Co = \begin{bmatrix} 0 & 0 & 0 & 0 \\ 0 & 0 & 0 & 0 \\ 0 & 0 & 0 & 0 \\ 0 & 0 & 0 & 0 \end{bmatrix}$$

$$Cg = \begin{bmatrix} 0 & 0 & 0 & 0 \\ 0 & 0 & 0 & 0 \\ 0 & 0 & 0 & 0 \\ 0 & 0 & 0 & 0 \end{bmatrix}$$

The inverse quantization circuit 601 of the first decompression block 111 performs inverse quantization on the first compressed data 122 of the current frame given by Equation (7) to create the image data given by the following Equation (9):

$$Y = \begin{bmatrix} 715 & 0 & 0 & 0 \\ 0 & 0 & 0 & 0 \\ 0 & 0 & 0 & 0 \\ 0 & 0 & 0 & 0 \end{bmatrix} \quad (9)$$

$$Co = \begin{bmatrix} 0 & 0 & 0 & 0 \\ 0 & 0 & 0 & 0 \\ 0 & 0 & 0 & 0 \\ 0 & 0 & 0 & 0 \end{bmatrix}$$

$$Cg = \begin{bmatrix} 0 & 0 & 0 & 0 \\ 0 & 0 & 0 & 0 \\ 0 & 0 & 0 & 0 \\ 0 & 0 & 0 & 0 \end{bmatrix}$$

When the inverse DCT conversion block 602 of the second decompression block 112 performs inverse DCT conversion—given by Equation (3)—on the image data given by Equation (8), elements of the brightness component Y of display data of the preceding frame after compression and decompression are all made "162", elements of color components Co and Cg are all made "0". When the inverse-color-space-conversion circuit 603 of the second decompression block 112 executes inverse-color-space conversion—given by Equation (4)—on the inverse DCT conversion data thus created, display data 121 of the preceding frame after compression and decompression which arises as an output of the second decompression block 112 are made "162" in all of R, G and B.

When the inverse DCT conversion block 602 of the first decompression block 111 performs inverse DCT conversion—presented by Equation (3)—on image data given by Equation (9), elements of the brightness component Y of display data of the current frame after compression and decompression are all made "178", and elements of color components Co and Cg are all made "0". When the inverse-color-space-conversion circuit 603 of the first decompression block 111 conducts inverse-color-space conversion—given by Equation (4)—on the inverse DCT conversion data thus created, display data 123 of the current frame after compression and decompression created by the first decompression block 111 are made "178" in all of R, G and B. Consequently, the grayscale level difference 16 between the preceding frame and the current frame becomes approximately equal to one-quarter the quantization coefficient of 65 with three primary colors R, G and B. As shown in FIGS. 1 and 9, the one-quarter coefficient is stored in the OD-nullification-coefficient-setting register 113 connected with the OD calculation circuit 114. However, in the first decompression block 111 and the second decompression block 112, operations such as the inverse DCT conversion and the inverse-color-space conversion are conducted after inverse quantization, and therefore an error coming from an operation error or the like develops. In addition, the quantization errors concerning color components Co and Cg are involved and therefore it is recommended to set a coefficient to store in the OD-nullification-coefficient-setting register 113 to be larger than one-quarter. However, what large value to set the coefficient to thereby to disable the OD processing by the OD calculation circuit 114 is a matter of system design. Therefore it is advantageous to make possible to set the coefficient of an appropriate value on the OD-nullification-coefficient-setting register 113.

For instance, it is assumed that a coefficient value of three eighth is placed in the OD-nullification-coefficient-setting register 113. In this condition, even in the case of displaying an image having sharp changes and complicated edges and including a relatively monotonous gradation part 1101 as shown in FIG. 11 while scanning the image, the grayscale level difference at the time of quantization falls within one grayscale level difference as shown in FIG. 4 with the gradation part 1101, input display data 117 of the current frame are output, and the display brightness 402 of an input image is output, provided that all of display data 117 are an output of the buffer 108. Thus, it becomes possible to output a beautiful image without causing quantization noise. In contrast, with an edge part having a large grayscale level difference, the grayscale level difference at the time of quantization is two or larger grayscale level difference, and therefore OD processing by the OD calculation circuit 114 is conducted, whereby brilliant and beautiful moving image characteristics can be reproduced concerning the edge part.

Further, the quantization coefficient 120 output by the latch circuit 209 of the second quantization module 204 of the compression block 109 is controlled to be always delayed by one frame from the quantization coefficient 207 output by the entropy coding circuit 205 of the compression block 109. Hence, compressed data respectively decompressed by the inverse quantization circuit 601 of the first decompression block 111, and the inverse quantization circuit 601 of the second decompression block 112—both are commonly controlled using the quantization coefficient 120—are subjected to inverse quantization using the same quantization coefficient 120 at all times. As a result, in regard to a still image, display data 121 of the preceding frame after compression and decompression, which are produced and output by the second decompression block 112, and display data 123 of the current frame after compression and decompression, which are produced and output by the first decompression block 111, make the same pixel value at all times. In this way, the OD calculation circuit 114 never execute an unnecessary OD processing on a still image and as such, the image quality of the still image is never deteriorated.

Next, an image-display operation by the liquid crystal driving circuit 101 according to the first embodiment of the invention, for which the structures as described above with reference to FIGS. 1, 2, and 6 to 9 are adopted, in the case of displaying a simple image as shown in FIG. 8 on the liquid crystal panel 105 while scanning the image will be described. In this case, the quantization coefficient is set to a small value. In such simple image, the deterioration of image quality is prone to very noticeable. However, because of its small quantization coefficient, an image subjected to OD calculation processing by the OD calculation circuit 114 will be output even with a small grayscale level difference between the background and quadrangle shown in FIG. 8. Consequently, a brilliant and beautiful moving picture can be displayed.

Second Embodiment

FIG. 13 is a diagram showing the structure of a display driving device according to the second embodiment of the invention.

The display driving device according to the second embodiment of the invention shown in FIG. 13 is different from the display driving device according to the first embodiment of the invention shown in FIG. 1 in the following points.

The display driving device according to the second embodiment of the invention shown in FIG. 13 is arranged so that the display region of the liquid crystal panel 105 can be divided into a plurality of display areas 1301-1306.

In regard to the display driving device according to the second embodiment of the invention shown in FIG. 13, the display driving circuit 101 includes an area-decision register 1308, which enables the division of the display region of the liquid crystal panel 105 into a plurality of display areas 1301-1306. Thanks to this arrangement, the display region of the liquid crystal panel 105 is divided into the display areas 1301-1306 according to a value set on the area-decision register 1308. Specifically, the display driving circuit 101 is arranged so that one display area can be selected from among the display areas 1301-1306 of the liquid crystal panel 105 according to an output value 1309 from the area-decision register 1308.

Further, in the display driving device according to the second embodiment of the invention shown in FIG. 13, a unique quantization coefficient and a unique data compression ratio can be used for each display area of the display areas 1301-1306 of the liquid crystal panel 105.

Therefore, unlike the display driving device according to the first embodiment of the invention shown in FIG. 1, in which one quantization coefficient 120 output by the compression block 109 is supplied to the first and second decompression blocks 111 and 112, and the OD calculation circuit 114, in the display driving device according to the second embodiment of the invention shown in FIG. 13, a plurality of quantization coefficients 1307 output by the compression block 109 are supplied to the first and second decompression blocks 111 and 112, and the OD calculation circuit 114. Particularly, the quantization coefficients 1307 correspond to the display areas 1301-1306 of the liquid crystal panel 105. The compression block 109, and the first and second decompression blocks 111 and 112 use one quantization coefficient 1307 corresponding to one display area selected from among the display areas 1301-1306 of the liquid crystal panel 105 for one display timing.

Therefore, the output value 1309 from the area-decision register 1308 is supplied to the compression block 109, and the first and second decompression blocks 111 and 112, and thus the compression block 109 and the first and second decompression blocks 111 and 112 are allowed to use one quantization coefficient 1307 corresponding to one display area selected from among the display areas 1301-1306 of the liquid crystal panel 105 according to the output value 1309 from the area-decision register 1308.

FIG. 14 is a diagram showing the structure of the compression block 109 of the liquid crystal driving circuit 101 according to the second embodiment of the invention shown in FIG. 13.

The compression block 109 in connection with the second embodiment of the invention shown in FIG. 14 is different from the compression block 109 in connection with the first embodiment of the invention shown in FIG. 2 in the following points.

The compression block 109 shown in FIG. 14 includes a plurality of target-data-size-setting circuits 1412-1417 to set a unique target compressed data size for each display area of the display areas 1301-1306 of the liquid crystal panel 105. CPU 102 can set unique target compressed data sizes on the target-data-size-setting circuits 1412-1417 through a user interface circuit (not shown) respectively.

Further, the counter 1402, the quantization-coefficient-control circuit 1401, and the latch circuit 1403 in the compression block 109 shown in FIG. 14, are replacements for the counter 210B, the quantization-coefficient-control circuit 211 and the latch circuit 212 in the entropy coding module 205 of the compression block 109 in connection with the first embodiment of the invention shown in FIG. 2. The counter 1402, the quantization-coefficient-control circuit 1401, and the latch circuit 1403 in the entropy coding module 205 of the compression block 109 of FIG. 14 are substantially equivalent to the counter 210B, the quantization-coefficient-control circuit 211 and the latch circuit 212 in the entropy coding module 205 of the compression block 109 shown in FIG. 2 in function, respectively.

Still further, the second quantization module 204 of the compression block 109 shown in FIG. 14 has a latch circuit 1404, which is a replacement for the latch circuit 209 of the second quantization module 204 of the compression block 109 shown in FIG. 2. Moreover, the second quantization module 204 of the compression block 109 shown in FIG. 14 has a selector circuit 1411 additionally provided.

The counter 1402, quantization-coefficient-control circuit 1401, and latch circuit 1403 of the entropy coding module 205 of the compression block 109 shown in FIG. 14, and the latch circuit 1404 of the second quantization module 204 constitute a quantization-coefficient-control block 1405.

The counter 1402 of the quantization-coefficient-control block 1405 serves to count up the number of bits of display compressed data after entropy coding on one display area 1301 selected from among the display areas 1301-1306 of the liquid crystal panel 105.

The quantization-coefficient-control circuit 1401 of the quantization-coefficient-control block 1405 compares a count value of the counter 1402 with a target data size 1412 of the one display area 1301 at the beginning of the subsequent frame, and decides the quantization coefficient value 1418 of the subsequent frame from the result of the comparison and the current quantization coefficient value 1418 held by the latch circuit 1403.

The latch circuit 1403 of the quantization-coefficient-control block 1405 holds an output value of the quantization-coefficient-control circuit 1401 at the beginning of the subsequent frame.

The latch circuit 1404 of the second quantization module 204 holds an output value of the latch circuit 1403 of the quantization-coefficient-control block 1405 at the beginning of the subsequent frame, and the output of the latch circuit 1404 is delayed from the output of the latch circuit 1403 by one frame.

The other quantization-coefficient-control blocks 1406-1410 can be arranged in the same way as the quantization-coefficient-control block 1405. In addition, the other quantization-coefficient-control blocks 1406-1410 set unique target compressed data sizes for the remaining display area 1302-1306 of the display areas 1301-1306 of the liquid crystal panel 105 respectively.

The selector circuit 1411 selects one quantization coefficient value 1418 from among quantization coefficient values 1418 of the subsequent frame arising from the outputs of the respective latch circuits 1403 of the quantization-coefficient-control blocks 1405-1410. The selected one quantization coefficient value 1418 is provided to the divider 208 of the second quantization module 204. The one quantization coefficient value 1418 selected by the selector circuit 1411 and supplied to the divider 208 corresponds to the quantization coefficient 207, which is supplied from the entropy coding module 205 of the compression block 109 to the divider 208 and latch circuit 209 of the second quantization module 204 in FIG. 2.

Therefore, in the display driving device according to the second embodiment of the invention described with reference to FIGS. 13 and 14, a ONE-SEG broadcasting image display region and another display region are separated as different regions when displaying a television image of ONE-SEG broadcasting on a cellular telephone, for example.

In addition, as a measure for the memory 110 for storing a display grayscale level of the preceding frame necessary for the OD calculation circuit 114 to conduct OD driving in the liquid crystal driving circuit 101 shown in FIG. 13, it becomes possible to set a quantization coefficient and a data compression ratio to smaller values on a display area for ONE-SEG broadcasting image display. As a result, it becomes possible to realize a brilliant and beautiful OD driving display on a ONE-SEG broadcasting image display area.

However, by setting the quantization coefficient and data compression ratio to larger values on another display area, it becomes possible to cut the amount of usage of the memory 110 used for OD driving display for the display area. In many cases, the image displayed on a display area other than a ONE-SEG broadcasting image display area is, at most, a small icon, or a simple image or still image using several plain colors. Therefore, even with the quantization coefficient and the data compression ratio set to large values, a relatively serious deterioration of image quality is unlikely to take place.

As described above, it becomes possible to assign a larger memory region to a display area on which a brilliant and beautiful OD driving display needs to be offered. Therefore, it becomes possible to achieve a low-cost overdrive adapted for an application software program.

While the various embodiments of the invention made by the inventor have been described above specifically, the invention is not limited to the embodiments. It is obvious that various changes and modifications may be made without departing from the subject matter thereof.

For instance, the liquid crystal driving circuit 101 according to the invention being not limited to an application to a portable electronic device, it can be used in performing an OD driving display on a stationary large-size household liquid crystal display panel, which can work on a commercial power source. In performing an OD driving display, a synchronous dynamic random access memory (SDRAM), which is an external memory of a semiconductor integrated circuit included in the liquid crystal driving circuit 101, is used as the memory 110 for OD driving.

What is claimed is:
1. A display driving circuit comprising:
an overdrive calculation circuit operable to generate an overdrive activation signal for improving a response characteristic of an external display drive according to display image data;
a drive-output device operable to supply the overdrive activation signal to the display device;
a compression circuit operable to store compressed display data created by compressing the display image data in a memory,
wherein the compression circuit includes a DCT calculation module operable to execute a discrete cosine transform of the display image data, and an entropy coding module operable to execute a variable length entropy coding of DCT conversion display data arising through an output of the DCT calculation module;
a decompression circuit operable to supply the overdrive calculation circuit with decompressed display data created by decompressing the compressed display data read out from the memory,
wherein the decompression circuit includes an inverse-entropy-coding circuit operable to execute an inverse entropy coding, which is an inverse of the variable length entropy coding by the entropy coding module, and an inverse DCT conversion module operable to execute an inverse DCT conversion which is an inverse of the discrete cosine transform by the DCT calculation module;
an other decompression circuit to which the DCT conversion display data created by the DCT calculation module of the compression circuit can be supplied without passing through the memory,
wherein the other decompression circuit includes an other inverse DCT conversion module operable to execute an other inverse DCT conversion, which is an inverse of the discrete cosine transform by the DCT calculation module,
other decompressed display data arising from an output of the other decompression circuit are supplied to the overdrive calculation circuit,
wherein the other decompressed display data arising from the output of the other decompression circuit in connection with display image data of a current frame are supplied to the overdrive calculation circuit,
the decompressed display data arising from the decompression circuit in connection with display image data of a preceding frame read out from the memory are supplied to the overdrive calculation circuit,
wherein the compression circuit includes first and second quantization modules connected with an output of the DCT calculation module,
an output signal arising from an output of the first quantization module is supplied to the other decompression circuit without passing through the memory,
an output signal arising from an output of the second quantization module is supplied to an input of the entropy coding module,
the other decompression circuit includes a first inverse quantization module having an output connected with an input of the other inverse DCT conversion module, and having an input to which the output signal generated by the first quantization module of the compression circuit is supplied, and
the decompression circuit includes a second inverse quantization module having an input connected with an out- put of the inverse-entropy-coding circuit, and having an output connected with an input of the inverse DCT conversion module.

2. The display driving circuit according to claim 1, wherein a quantization coefficient supplied to the second quantization module of the compression circuit is set by comparing a bit number of compressed data of one frame of the entropy coding module of the compression circuit with a target compressed data amount, and an other quantization coefficient supplied to the first quantization module of the compression circuit, the first inverse quantization module of the other decompression circuit, and the second inverse quantization module of the decompression circuit is a value gained by delaying the quantization coefficient by one frame of time.

3. The display driving circuit according to claim 1, wherein the other quantization coefficient can be set for each display area of a plurality of display areas of the display device independently.

4. The display driving circuit according to claim 3, wherein the compression circuit includes a plurality of registers for independently setting the other quantization coefficient for each display area of the plurality of display areas of the display device.

5. The display driving circuit according to claim 2, wherein the other quantization coefficient is supplied to the overdrive calculation circuit, whereby the overdrive calculation circuit selects, as an output of the overdrive calculation circuit, one of the overdrive activation signal generated by the overdrive calculation circuit and the display image data of the current frame according to an absolute value of a difference between the other decompressed display data arising from the output of the other decompression circuit, which is compressed and decompressed data of the current frame, and the decompressed display data created by the decompression circuit as compressed and decompressed data of the preceding frame.

6. A display driving circuit comprising:
an overdrive calculation circuit operable to generate an overdrive activation signal for improving a response characteristic of an external display drive according to display image data;
a drive-output device operable to supply the overdrive activation signal to the display device;
a compression circuit operable to store compressed display data created by compressing the display image data in a memory,
wherein the compression circuit includes a compression module for materializing a compression method by which a ratio of bit numbers of data after and before compression can be changed by setting a parameter;
a decompression circuit operable to supply the overdrive calculation circuit with decompressed display data created by decompressing the compressed display data read out from the memory,
wherein the decompression circuit includes a decompression module for materializing a decompression method, which is an inverse of processing of the compression method by which a ratio of bit numbers of data after and before compression can be changed by setting a parameter;
an other decompression circuit to which other display data after compression created by the compression circuit is supplied without passing through the memory,
wherein the other decompression circuit includes a decompression module for materializing a decompression method, which is an inverse of processing of a compression method by which a ratio of bit numbers of data after and before compression can be changed by setting a parameter;
an other decompressed display data arising from an output of the other decompression circuit is supplied to the overdrive calculation circuit,
wherein the other decompressed display data arising from the output of the other decompression circuit in connection with display image data of a current frame are supplied to the overdrive calculation circuit,
the decompressed display data arising from the decompression circuit in connection with display image data of a preceding frame read out from the memory are supplied to the overdrive calculation circuit,
wherein the compression circuit includes first and second nonreversible compression modules operable to perform a nonreversible compression according to the parameter for setting a ratio of bit numbers of data after and before compression,
an output signal arising from an output of the first nonreversible compression module is supplied to the other decompression circuit without passing through the memory,
an output signal arising from an output of the second nonreversible compression module is stored in the memory,
the other decompression circuit includes a first decompression module operable to execute an inverse of processing of the first nonreversible compression module of the compression circuit, and
the decompression circuit accepts input of data read out from the memory, and includes a second decompression module operable to execute an inverse of processing of the second nonreversible compression module of the compression circuit.

7. The display driving circuit according to claim 6, wherein the parameter for setting the ratio of bit numbers of data after and before compression, which is supplied to the second nonreversible compression module of the compression circuit, is set according to a result of a comparison between a bit number of compressed data of one frame of the compression circuit, and a target compressed data amount, and the parameter for setting the ratio of bit numbers of data after and before compression, which is supplied to the first nonreversible compression module of the compression circuit, the first decompression module of the other decompression circuit, and the second decompression module of the decompression circuit is a value gained by delaying, by one frame of time, the parameter for setting the ratio of bit numbers of data after and before compression supplied to the second nonreversible compression module of the compression circuit.

8. The display driving circuit according to claim 6, wherein the parameter for setting a ratio of bit numbers of data after and before compression is set for each display area of a plurality of display areas of the display device independently.

9. The display driving circuit according to claim 8, wherein the compression circuit includes a plurality of registers for independently setting the parameter for setting a ratio of bit numbers of data after and before compression for each display area of the plurality of display areas of the display device.

10. The display driving circuit according to claim 7, wherein the parameter for setting a ratio of bit numbers of data after and before compression is supplied to the overdrive calculation circuit, whereby the overdrive calculation circuit selects, as an output of the overdrive calculation circuit, one of the overdrive activation signal generated by the overdrive calculation circuit and the display image data of the current frame according to an absolute value of a difference between the other decompressed display data arising from the output of the other decompression circuit, which is compressed and decompressed data of the current frame, and the decompressed display data created by the decompression circuit as compressed and decompressed data of the preceding frame.

* * * * *